(12) United States Patent
Guedalia

(10) Patent No.: US 6,536,043 B1
(45) Date of Patent: Mar. 18, 2003

(54) METHOD AND SYSTEMS FOR SCALABLE REPRESENTATION OF MULTIMEDIA DATA FOR PROGRESSIVE ASYNCHRONOUS TRANSMISSION

(75) Inventor: Jacob Leon Guedalia, Jerusalem (IL)

(73) Assignee: Roxio, Inc., Santa Clara, CA (US)

( * ) Notice: Subject to any disclaimer, the term of this patent is extended or adjusted under 35 U.S.C. 154(b) by 0 days.

(21) Appl. No.: 08/778,830

(22) Filed: Jan. 6, 1997

(30) Foreign Application Priority Data

Feb. 14, 1996 (IL) .................................................. 117133

(51) Int. Cl.[7] ........................... H04N 7/173; H04B 1/66
(52) U.S. Cl. ....................... 725/90; 725/95; 375/240.11
(58) Field of Search .............................. 725/86, 87, 91, 725/92, 93, 94, 95, 96, 100, 134, 90, 98; 709/217–219, 231; 375/240.11, 240.19, 240.24, 240.26; 348/425.1, 423.1, 398.1; 382/234–235

(56) References Cited

U.S. PATENT DOCUMENTS

| | | |
|---|---|---|
| 4,752,836 A | 6/1988 | Blanton et al. ............. 358/342 |
| 4,897,867 A | 1/1990 | Foster et al. ................... 379/94 |
| 5,119,188 A | 6/1992 | McCalley et al. ............. 358/86 |
| 5,122,873 A | 6/1992 | Golin ........................ 358/133 |
| 5,195,092 A | 3/1993 | Wilson et al. ............. 370/94.2 |

(List continued on next page.)

Primary Examiner—Bhavesh Mehta
Assistant Examiner—Hunter Lonsberry
(74) Attorney, Agent, or Firm—Martine & Penilla, LLP

(57) ABSTRACT

A system for transmitting digital data representing an original over plural transmission links, at least of which have limited bandwidth, including a digital data source storing digital data representing the original, a digital data receiver receiving the digital data representing the original via one of the plural transmission links having limited bandwidth and a digital data transmitter operative to transmit the digital data representing the original to the receiver over a transmission link having a limited bandwidth in plural blocks which are sequentially transmitted at a rate determined by the limited bandwidth, each block being an incomplete collection of data which includes parts of multiple frames, each frame being viewable in a selectable order by the receiver even when less than all of the plural blocks have been received, receipt of subsequent blocks by the receiver being used to cumulatively improve the quality of the digital data viewed by the receiver.

20 Claims, 18 Drawing Sheets

U.S. PATENT DOCUMENTS

| | | | |
|---|---|---|---|
| 5,220,420 A | 6/1993 | Hoarty et al. | 358/86 |
| 5,236,199 A | 8/1993 | Thompson, Jr. | 273/439 |
| 5,251,209 A | 10/1993 | Jurkevich et al. | 370/82 |
| 5,265,248 A | 11/1993 | Moulios et al. | 395/650 |
| 5,283,819 A | 2/1994 | Glick et al. | 379/90 |
| 5,325,423 A | 6/1994 | Lewis | 379/90 |
| 5,351,276 A | 9/1994 | Doll, Jr. et al. | 379/67 |
| 5,363,482 A | 11/1994 | Victor et al. | 395/157 |
| 5,396,583 A | 3/1995 | Chen et al. | 395/127 |
| 5,414,455 A | 5/1995 | Hooper et al. | |
| 5,420,572 A | 5/1995 | Dolin, Jr. et al. | 340/825.22 |
| 5,420,801 A | 5/1995 | Dockter et al. | 364/514 R |
| 5,421,031 A | 5/1995 | De Bey | |
| 5,438,658 A | 8/1995 | Fitzpatrick et al. | 395/153 |
| 5,487,167 A | 1/1996 | Dinallo et al. | 395/650 |
| 5,495,576 A | 2/1996 | Ritchey | 395/125 |
| 5,497,435 A | 3/1996 | Berger | 382/249 |
| 5,508,940 A | 4/1996 | Rossmere et al. | 364/514 A |
| 5,512,934 A | 4/1996 | Kochanski | |
| 5,519,435 A | 5/1996 | Anderson | 348/8 |
| 5,528,281 A | 6/1996 | Grady et al. | |
| 5,541,659 A * | 7/1996 | Kojima | 375/240.11 |
| 5,544,313 A | 8/1996 | Shachnai et al. | |
| 5,553,221 A | 9/1996 | Reimer et al. | 395/154 |
| 5,553,222 A | 9/1996 | Milne et al. | 395/154 |
| 5,557,538 A | 9/1996 | Retter et al. | 364/514 A |
| 5,561,791 A | 10/1996 | Mendelson et al. | 395/550 |
| 5,564,001 A | 10/1996 | Lewis | 395/154 |
| 5,577,180 A | 11/1996 | Reed | 395/135 |
| 5,577,258 A | 11/1996 | Cruz et al. | 395/800 |
| 5,581,783 A | 12/1996 | Ohashi | 395/825 |
| 5,585,852 A * | 12/1996 | Agarwal | 375/240.11 |
| 5,633,684 A * | 5/1997 | Teranishi | 375/240.11 |
| 5,721,829 A * | 2/1998 | Dunn | 725/87 |
| 5,737,533 A * | 4/1998 | de Hond | 709/219 |
| 5,784,277 A * | 7/1998 | Meyer | 700/94 |
| 5,878,233 A * | 3/1999 | Schloss | 709/225 |

\* cited by examiner

METHOD AND SYSTEMS FOR SCALABLE REPRESENTATION OF MULTIMEDIA DATA FOR PROGRESSIVE ASYNCHRONOUS TRANSMISSION

FIELD OF THE INVENTION

The present invention relates to methods and systems for encoding digital multimedia data for transmission over a network.

BACKGROUND OF THE INVENTION

The following U.S. Patents have been found in a U.S. Patent Search and are believed to be generally relevant to the field of the invention:

| | | |
|---|---|---|
| 4,897,867 | 1/90 | Foster et al. |
| 5,119,188 | 6/92 | McCalley et al. |
| 5,122,873 | 6/92 | Golin |
| 5,195,092 | 3/93 | Wilson et al. |
| 5,220,420 | 6/93 | Hoarty et al. |
| 5,236,199 | 8/93 | Thompson, Jr. |
| 5,251,209 | 10/93 | Jurkevich et al. |
| 5,265,248 | 11/93 | Moulios et al. |
| 5,283,819 | 1/94 | Glick et al. |
| 5,325,423 | 6/94 | Lewis |
| 5,351,276 | 9/94 | Doll, Jr. et al. |
| 5,363,482 | 11/94 | Victor et al. |
| 5,420,572 | 5/95 | Dolin, Jr. et al. |
| 5,420,801 | 5/95 | Dockter et al. |
| 5,438,658 | 8/95 | Fitzpatrick et al. |
| 5,487,167 | 1/96 | Dinallo et al. |
| 5,495,576 | 2/96 | Ritchey |
| 5,508,940 | 4/96 | Rossmere et al. |
| 5,519,435 | 5/96 | Anderson |
| 5,553,221 | 9/96 | Reimer et al. |
| 5,553,222 | 9/96 | Milne et al. |
| 5,557,538 | 9/96 | Retter et al. |
| 5,561,791 | 10/96 | Mendelson et al. |
| 5,564,001 | 10/96 | Lewis |
| 5,577,180 | 11/96 | Reed |
| 5,577,258 | 11/96 | Cruz et al. |
| 5,581,783 | 12/96 | Ohashi |

When using various media such as video, audio, text and images, a user generally retrieves the media from a storage device or "server" connected via a network to many computers or users. The server downloads the media to the network and transmits it to the user at the user's request.

There are two basic limitations involved in such data retrieval: delay between the time that a user requests the data and the time when the server downloads it to the network, and bandwidth limitations on data throughput and rate of data transmission. The present invention relates to the second limitation.

One example of such a system includes a CD ROM drive and personal computer which may be located at the same site. Another example includes a network connecting Internet servers and users' personal computers. Such networks are installed in order to facilitate convenient data transmission between users and data distribution from the server to the users' computers.

When a user retrieves the media from a storage device or server, typically connected via a network, the aforesaid bandwidth limitations affect the amount of time required to transmit a video frame from the server to the user, and thus limit the video frame rate. Moreover, when dealing with object movies and panoramas the files being transmitted are extremely large, so that overcoming bandwidth limitations is a critical enabling factor, even for high bandwidth networks.

Currently, two methods are employed to overcome bandwidth limitations: The first is to compress the video frame sequence, thereby speeding up transmission time at the cost of additional downstream processing to decompress the frames prior to display. The second is to copy the entire sequence to an intermediate storage device, such as a user's hard disk, to which the user has higher bandwidth access, at the cost of delaying the viewing of the video until the entire sequence has been delivered.

Known network applications involve streaming data from a server to a client computer (hereinafter also referred to as "client"). "Streaming" refers to serial or parallel transmission of digital data between two computers, by transmitting sequences of bit packets. For example, installation executables on a network server stream files to a client computer performing the installation. Servers with large amounts of memory are used to archive digital movies, which are streamed to a client computer for viewing upon demand. Digital video is broadcast from cable stations to subscribers using streaming. Internet browsers, such as Netscape and Microsoft Explorer, are used to stream data from a server on the web to a client. Internet web sites can contain enormous databases, such as phone directories for all of the cities in the U.S., photographs from art galleries and museums around the world, voluminous encyclopedias, and even copies of all patents ever issued by the U.S. Patent & Trademark Office. Clients using the Internet can search these databases and then request the server to download specific information. This request initiates a streaming event.

In view of the multitude of bandwidths present in complex client/server systems today and the large amounts of data necessary to produce compelling audio, video and imaging presentations, there is a pressing demand for scalable data representation of multimedia data, so that it can be delivered for on-line interactive playback in such a form that the transmission rate can accommodate the client bandwidth. The Internet is an example of a complex system where clients with many different bandwidth constraints demand multimedia data from server sites. There are several low bandwidth rates for modem transmission over phone lines, higher rates for frame relay lines, higher rates for ISDN lines, even higher rates for T1 lines, etc.

SUMMARY OF THE INVENTION

The present invention seeks to provide an improved method and system for transmitting digital data representing the original over plural transmission links at least some of which have limited bandwidth.

The present invention relates to scalable encoding, which enables two or more clients, connected to a server by lines having differing bandwidth, to begin playing the multimedia data on-line, and both at the same time, almost immediately after the start of streaming, but the lower bandwidth client receives lower quality media than the higher bandwidth client at first. As the media is replayed in the foreground and the bandwidth is freed, more data streams in via background, and the quality of the media is enhanced.

Without scalable encoding, a client of an Internet application must wait until the requested data arrives, at whatever rate its network line provides. A client with a 14.4 Kbs modem line, for example, would have to wait twice as long as a client with a 28.8 Kbs modem line. Moreover, if the data was encoded for 28.8 Kbs on-line playback, the 14.4 Kbs client would never be able to achieve live playback, since there would be an ever-increasing lag in the data stream. Conversely, if the data were encoded for 14.4 Kbs on-line playback, the 28.8 Kbs client would receive unnecessarily poor quality media.

On account of the progressive nature of the data representation in accordance with the present invention, the additional data block arriving in a 14.4 Kbs stream combines with the previous data block which arrived in a 14.4 Kbs stream, to produce a 28.8 Kbs streamed version; all that is being sent is the incremental data necessary for the upgrade. The progressive form of the encoding itself provides the ability to achieve scalability.

Another shortcoming of non-scalable encoding as in the prior art is the inability to preview a video sequence. Often a client would like to play a quick preview of a video clip, before deciding whether or not to download it. The scalable representation of the present invention can be used to deliver the video in a preview mode, as the first data blocks. If the client continues to download the video after previewing, the first data block already transmitted is progressively integrated with additional data blocks to create the full viewing video.

The present invention can also be applied to enhance delivery of large still images for multi-resolution gazing. Current technology transmits such images as large files, and carries out extensive computations for sub-sampling to lower resolution and zooming in to areas of interest for gazing. This makes it very time consuming to interact with large images, and as a result it is currently impractical to produce high resolution images for Internet browsing. When dealing with large images, producers simply sub-sample them to fit entirely within a computer monitor screen, and store the resulting low resolution images on web servers. Using the technology of the present invention, producers can deliver high resolution images over the Internet for rapid interactive gazing.

The present invention seeks to provide a scalable representation of multimedia data, enabling the data to be (a) progressively streamed, (b) transmitted asynchronously to clients at different bandwidths and (c) played back interactively on-line. The representation is two-dimensional, with one dimension (block number) being characterized by progressiveness in quality, and the second dimension (frame number) being characterized by interactivity.

The representation comprises data blocks which are integrated with one another to produce successively higher bandwidth versions of the media, the data blocks comprising encoded frames. The first data block corresponds to the lowest bandwidth, and enables the client with this bandwidth to play back the media on-line at the lowest quality. The second data block, when integrated with the first block, corresponds to the next higher bandwidth, and enables the client with this bandwidth to play back the media on-line at the next highest quality, and similarly for each successive data block.

Moreover, a client with the lowest bandwidth who played the media at the low quality and freed the bandwidth can continue in background to receive successive data blocks and integrate them with previously received data blocks, resulting in successively higher quality media each time it is replayed. The modular form of the data representation thus makes it possible to both accommodate different bandwidths and progressively update media quality. A production tool makes it possible for a producer to control modularity and quality settings.

In accordance with the present invention there is provided a method for providing on-line virtual reality movies, comprising inputting a cyclic movie sequence into an encoder, determining the number of portions that each frame of said movie is divided into, and forming partial frames, specifying hot-spots and independent objects for interaction within a partial frame, transmitting the partial frames part by part to a user's asynchronous database, and displaying said frames on a user's interface.

There is also provided in accordance with a preferred embodiment of the present invention a system for producing virtual reality (VR) movies comprising an encoder for preparing the VR movie for transmission, and a server including a repository for the VR movie and a transceiver for transmitting the movie, part by part to a user, upon request.

An essential feature of the present invention is the use of a two-dimensional interactive progressive database to represent multimedia data, and the storage of this database in three different forms: for streaming, processing and playback purposes. The database is calibrated in data blocks of roughly equal size, to deliver the media for on-line playback at a selected range of bandwidths, and in such a way that the higher bandwidth versions are built by integrating data blocks with the lower bandwidth versions. Thus, rather than discard the lower bandwidth data, it is saved and used directly to upgrade from low to high bandwidth quality.

The data blocks themselves are comprised of frames which can be randomly accessed, thus giving a second dimension (namely, frames) to the progressive database. Thus it is possible to selectively build higher quality versions of some frames and not others. The mechanism determining which frames to send within each block may be controlled interactively by the user.

To best appreciate the achievement of the present invention, one should consider it in the broader perspective of streaming technology. There are known two modes of accessing streamed data: random access and sequential access. In a random access mode, the client can request the server to transmit data from any position within the stream. In a sequential access mode, the server can only send a serial stream.

Current Internet streaming technology does not provide random access. Rather, the stream is sent serially in packets. The present invention operates by creating three copies of the progressive database. A first copy is stored on the server serially. A second copy, which mirrors the server database, is built on the client, with random accessibility. These first two copies are in encoded form. The frames in the data blocks from the second copy are decoded and stored in the third copy. The third copy is dynamically updated and contains the frames to be displayed in either raw bitmap form, or in intermediate compressed form whereby the decompression is fast enough to keep up with real time interactive display in response to user commands.

A by-product of the present invention, when applied to video clips, is the ability to deliver a preview of the video using the first data blocks. This enables the client to play the preview almost immediately after the transmission begins, and then to quickly decide whether or not to proceed with the download. Moreover, if the client does continue with the download, then the first data block already transmitted is integrated with additional data blocks being downloaded, to form the full view version of the video. Thus, rather than discard the data transmitted for the preview, it is saved and used to create the full view frame sequence.

The present invention can also be applied to efficiently deliver large still images at multiple resolutions for interactive gazing. Each block of the progressive database stores various tiles of the image at different resolutions. Smaller tiles are stored at higher resolution. Hot spots are used to link tiles at lower resolution to smaller tiles contained within them at higher resolution. When a viewer clicks on a hot spot to gaze, the display quickly brings up the tile linked to by the hot spot, giving the effect of an instant zoom in. The totality of multi-resolution tiles may comprise the "frames" in this application, and these frames form the interactivity dimension of the database.

The first tile consists of the lowest resolution version of the full image, with hot spots encoded within it. As soon as the first tile is delivered and decoded, the user can at once begin gazing at the higher resolution tiles, even though the image is of low quality. While the user is viewing the tiles, additional data blocks are being delivered and decoded in background, and the quality of the tiles is being upgraded as time progresses. In other words, the zoomed in portion of the image being gazed at gets displayed almost immediately after the streaming begins, but at low quality. The quality improves with time.

The higher resolution tiles correspond to hierarchical "areas of interest" in the image. The choice of which areas to mark with hot spots as areas of interest is in the hands of the producer. This use of the invention is particularly efficient in the case where there is a relatively small number of areas of interest in the full image, so that relatively few tiles are encoded at the higher resolutions. Without the present invention, the client would have to wait to receive the full image at higher resolution before viewing any part of it at this resolution, even though only small parts of it are of interest. Moreover, each zoom in and out would be both processor and memory demanding. Viewer interactivity would be painfully slow.

There is thus provided in accordance with a preferred embodiment of the present invention a system for transmitting digital data representing the original over plural transmission links at least some of which have limited bandwidth including:

a digital data source storing digital data representing an original;

a digital data receiver receiving the digital data representing an original via one of the plural transmission links having limited bandwidth; and a digital data transmitter operative to transmit the digital data representing an original to the receiver over a transmission link having a limited bandwidth in plural blocks which are sequentially transmitted at a rate determined by the limited bandwidth, each block being an incomplete collection of data which includes parts of multiple frames, each frame being viewable in a selectable order by the receiver even when less than all of the plural blocks have been received, receipt of subsequent blocks by the receiver being used to cumulatively improve the quality of the digital data viewed by the receiver.

There is additionally provided in accordance with a preferred embodiment of the present invention a digital data transmitter actuator comprising:

an organizer operative, when actuated, to access digital data representing an original which is organized in plural blocks for subsequent transmission, each block being an incomplete collection of data which includes parts of multiple frames, each frame being viewable in a selectable order by the a receiver even when less than all of the plural blocks have been received; and a receiver instruction interface responsive to interactive inputs from a receiver for actuating the organizer to select a given block and at least one given partial frame within the given block for transmission.

There is also provided in accordance with a preferred embodiment of the present invention a digital data receiver including:

a data receipt interface receiving digital data representing an original in a plurality of sequential blocks, each block being an incomplete collection of data which includes parts of multiple frames;

a block accumulator for combining plural blocks as they are received for viewing by the recipient; and a viewer including a recipient interface which permits each frame to be viewed in an order selected by the recipient, even when less than all of the plural blocks have been received, combining of plural blocks by the block accumulator being used to improve the quality of the digital data viewed by the recipient.

There is additionally provided in accordance with a preferred embodiment of the present invention a method for transmitting digital data representing an original over plural transmission links at least some of which have limited bandwidth including the steps of:

storing digital data representing an original;

receiving at a receiver the digital data representing an original via one of the plural transmission links having limited bandwidth; and transmitting the digital data representing an original to the receiver over a transmission link having a limited bandwidth in plural blocks which are sequentially transmitted at a rate determined by the limited bandwidth, each block being an incomplete collection of data which includes parts of multiple frames, each frame being viewable in a selectable order by the receiver even when less than all of the plural blocks have been received, receipt of subsequent blocks by the receiver being used to cumulatively improve the quality of the digital data viewed by the receiver.

There is also provided in accordance with a preferred embodiment of the present invention a method for digital data transmission including:

organizing digital data representing an original into plural blocks for subsequent transmission, each block being an incomplete collection of data which includes parts of multiple frames, each frame being viewable in a selectable order by the a receiver even when less than all of the plural blocks have been received;

responsive to interactive inputs from a receiver for actuating the organizer, selecting a given block and at least one given partial frame within the given block for transmission; and transmitting the selected given block and at least one given partial frame to a user.

In accordance with a preferred embodiment of the present invention, the block accumulator is operative to combine plural blocks which are distinguished from each other by their respective frequency bands.

Preferably, the digital data receiver includes a fractal decompression engine.

In accordance with a preferred embodiment of the present invention, the data receipt interface is operative to initially receive a first plurality of blocks containing relatively low frequency data and thereafter receive a second plurality of blocks containing relatively high frequency data and the block accumulator is operative to reconstitute the digital data representing an original from the blocks representing relatively high frequency and relatively low frequency data.

Preferably, the block accumulator is operative to combine plural blocks having different sampling.

In accordance with a preferred embodiment of the present invention, the sampling rate of a combined plurality of blocks is equal to the sum of the sampling rates of individual ones of the plurality of blocks.

Preferably, the digital data receiver includes a wavelet decoder.

In accordance with a preferred embodiment of the present invention, the block accumulator includes a dequantizer which combines blocks each of which contain quantized data of a different order, such that accumulation of multiple blocks provides combined data of greater precision than that contained in any single block.

There is additionally provided in accordance with a preferred embodiment of the present invention a digital data transmitter actuator including:

an organizer operative, when actuated, to access digital data representing an original which is organized in plural blocks for subsequent transmission, each block being an incomplete collection of data which includes parts of multiple frames, each frame being viewable in a selectable order by the a receiver even when less than all of the plural blocks have been received; and a receiver instruction interface responsive to interactive inputs from a receiver for actuating the organizer to select a given block and at least one given partial frame within the given block for transmission.

In accordance with a preferred embodiment of the present invention a first one of the plural blocks contains digital data which represents a first approximation to the original.

Preferably, additional ones of the plural blocks, when combined with the first one of the plural blocks provide additionally accurate approximations to the original.

In accordance with a preferred embodiment of the present invention each of the multiple frames includes a portion of data which can be independently and interactively manipulated.

Preferably, the system also includes a block generator operative to receive digital data representing the original and to provide the plural blocks.

There is also provided in accordance with a preferred embodiment of the present invention a block generator including:

a producer interface; and a digital data compressor, operative in response to producer control parameters received via the producer interface for receiving digital data representing an original and providing plural blocks, each block being an incomplete collection of data which includes parts of multiple frames.

In accordance with a preferred embodiment of the present invention the block generator is operative to provide plural blocks which are distinguished from each other by their respective frequency bands.

Preferably, the block generator includes a fractal compression engine.

In accordance with a preferred embodiment of the present invention, the block generator is operative to decompose the digital data representing an original in relatively high frequency and relatively low frequency digital data portions, and wherein a first plurality of blocks containing the relatively low frequency portion is transmitted by the data transmitter prior to transmission of a second plurality of blocks containing the relatively high frequency portion.

Preferably, the block generator is operative to provide plural blocks by sampling the received digital data.

In accordance with a preferred embodiment of the present invention the sampling rate of a plurality of blocks is equal to the sum of the sampling rates of individual ones of the plurality of blocks.

Preferably, the block generator includes a wavelet encoder.

In accordance with a preferred embodiment of the present invention, the block generator includes a quantizer which produces blocks each of which contain quantized data of a different order, such that accumulation of multiple blocks provides combined data of greater precision than that contained in any single block.

There is also provided in accordance with another preferred embodiment of the present invention, a method for encoding original digital video data to be stored on a server computer for on-line delivery to client computers, including the steps of:

encoding the digital video into a database including a series of encoded data blocks, each block including a sequence of encoded frames, with the property that successive blocks when decoded and integrated together provide successively higher bandwidth versions of the video for on-line playback;

storing the database on a server computer;

processing a request by a client computer for on-line delivery of the video in order to determine which data blocks to transmit, so as to accommodate the client bandwidth;

transmitting the necessary data blocks to the client;

decoding the data blocks on the client computer;

integrating the data blocks together on the client computer to reconstruct an appropriate version of the original digital video; and playing the reconstructed video on the client computer.

Further in accordance with a preferred embodiment of the present invention, the step of encoding includes a bit-rate control device enabling the producer to pre-select the sequence of bandwidths or quality levels for the database.

Still further in accordance with a preferred embodiment of the present invention, the step of encoding is performed in such a way that the first blocks of the database correspond to previews of the video.

Additionally in accordance with a preferred embodiment of the present invention, the steps of transmitting, decoding, integrating and playing are repeated in succession a number of times in order to transmit additional data blocks to the client, thereby upgrading the quality of the video while it is replayed.

There is also provided in accordance with another preferred embodiment of the present invention a method for encoding original digital audio data to be stored on a server computer for on-line delivery to client computers, including the steps of:

encoding the digital audio into a database including a series of encoded data blocks, each block including a sequence of encoded frames, with the property that successive blocks when decoded and integrated together provide successively higher bandwidth versions of the audio for on-line playback;

storing the database on a server computer;

processing a request by a client computer for on-line delivery of the audio in order to determine which data blocks to transmit, so as to accommodate the client bandwidth;

transmitting the necessary data blocks to the client;

decoding the data blocks on the client computer;

integrating the data blocks together on the client computer to reconstruct an appropriate version of the original digital audio; and playing the reconstructed audio on the client computer.

Further in accordance with a preferred embodiment of the present invention, the step of encoding includes a bit-rate control device enabling the producer to pre-select the sequence of bandwidths or quality levels for the database.

Still further in accordance with a preferred embodiment of the present invention, the steps of transmitting, decoding, integrating and playing are repeated in succession a number of times in order to transmit additional data blocks to the client, thereby upgrading the quality of the audio while it is replayed.

There is also provided in accordance with another preferred embodiment of the present invention, a method for encoding original digital object movie data to be stored on a server computer for on-line delivery to client including, comprising the steps of:

encoding the digital object movie into a database including a series of encoded data blocks, each block including a sequence of encoded frames, with the property that successive blocks when decoded and integrated together provide successively higher bandwidth versions of the object movie for on-line playback;

storing the database on a server computer;

processing a request by a client computer for on-line delivery of the object movie in order to determine which data blocks to transmit, so as to accommodate the client bandwidth;

transmitting the necessary data blocks to the client;

decoding the data blocks on the client computer;

integrating the data blocks together on the client computer to reconstruct an appropriate version of the original digital object movie; and playing the reconstructed object movie on the client computer.

Further in accordance with a preferred embodiment of the present invention, the step of encoding includes a bit-rate control device enabling the producer to pre-select the sequence of bandwidths or quality levels for the database.

Still further in accordance with a preferred embodiment of the present invention, the steps of transmitting, decoding, integrating and playing are repeated in succession a number of times in order to transmit additional data blocks to the client, thereby upgrading the quality of the object movie while it is replayed.

There is also provided in accordance with another preferred embodiment of the present invention a method for encoding an original digital panorama to be stored on a server computer for on-line delivery to client computers, including the steps of:

encoding the digital panorama into a database including a series of encoded data blocks, each block including a sequence of encoded frames, with the property that successive blocks when decoded and integrated together provide successively higher bandwidth versions of the panorama for on-line playback;

storing the database on a server computer;

processing a request by a client computer for on-line delivery of the panorama in order to determine which data blocks to transmit, so as to accommodate the client bandwidth;

transmitting the necessary data blocks to the client;

decoding the data blocks on the client computer;

integrating the data blocks together on the client computer to reconstruct an appropriate version of the original digital panorama; and playing the reconstructed panorama on the client computer.

Further in accordance with a preferred embodiment of the present invention the step of encoding includes a bit-rate control device enabling the producer to pre-select the sequence of bandwidths or quality levels for the database.

Still further in accordance with a preferred embodiment of the present invention the steps of transmitting, decoding, integrating and playing are repeated in succession a number of times in order to transmit additional data blocks to the client, thereby upgrading the quality of the panorama while it is replayed.

There is also provided in accordance with another preferred embodiment of the present invention a method for encoding original digital large still image data to be stored on a server computer for on-line delivery to client computers, including the steps of:

encoding the large digital image into a database including a series of encoded data blocks, each block including a sequence of encoded multi-resolution tiles of the image, with the property that successive blocks when decoded and integrated together provide successively higher quality versions of the tiles for display;

storing the database on a server computer;

processing a request by a client computer for on-line delivery of the image in order to determine which data blocks to transmit;

transmitting the necessary data blocks to the client;

decoding the data blocks on the client computer;

integrating the data blocks together on the client computer to reconstruct an appropriate version of the original multi-resolution image tiles; and interactively displaying the reconstructed tiles on the client computer.

Still further in accordance with a preferred embodiment of the present invention the step of encoding includes a compression control device enabling the producer to pre-select the sequence of quality levels for the database.

Additionally in accordance with a preferred embodiment of the present invention the step of encoding operates on a plurality of images forming an animation, and each encoded data block is comprised of multi-resolution tiles from the plurality of images.

There is also provided in accordance with another preferred embodiment of the present invention a video processing system operative on digital video data for encoding the digital video, storing it on a server computer and delivering it to client computers on-line upon request including:

an encoder for compressing the digital video into a database including a series of encoded data blocks, each block including a sequence of encoded frames, with the property that successive blocks when decoded and integrated together provide successively higher bandwidth versions of the video for on-line playback;

a storage device for archiving the database on a server computer;

a processing unit for accepting a request by a client computer for on-line delivery of the video and determining which data blocks to transmit, so as to accommodate the client bandwidth;

a transmitter for delivering the necessary data blocks to the client;

a decoder for decompressing the data blocks back into video data on the client computer;

an accumulator for integrating the data blocks together on the client computer to reconstruct an appropriate version of the original digital video; and a player on the client computer for playing the reconstructed digital video.

Additionally in accordance with a preferred embodiment of the present invention the encoder includes a bit-rate controller enabling the user to pre-select the sequence of bandwidths or quality levels for the database.

Moreover in accordance with a preferred embodiment of the present invention the encoder compresses the digital video in such a way that the first blocks of the database correspond to previews of the video.

Further in accordance with a preferred embodiment of the present invention the transmitter, decoder, accumulator and player repeatedly operate in succession a number of times in order to transmit additional data blocks to the client, thereby upgrading the quality of the video while it is being replayed.

There is also provided in accordance with another preferred embodiment of the present invention an audio processing system operative on digital audio data for encoding the digital audio, storing it on a server computer and delivering it to client computers on-line upon request including:

an encoder for compressing the digital audio into a database including a series of encoded data blocks, each block including a sequence of encoded frames, with the property that successive blocks when decoded and integrated together provide successively higher bandwidth versions of the audio for on-line playback;

a storage device for archiving the database on a server computer;

a processing unit for accepting a request by a client computer for on-line delivery of the audio and determining which data blocks to transmit, so as to accommodate the client bandwidth;

a transmitter for delivering the necessary data blocks to the client;

a decoder for decompressing the data blocks back into audio data on the client computer;

an accumulator for integrating the data blocks together on the client computer to reconstruct an appropriate version of the original digital audio; and a player on the client computer for playing the reconstructed digital audio.

Further in accordance with a preferred embodiment of the present invention the encoder includes a bit-rate controller enabling the user to pre-select the sequence of bandwidths or quality levels for the database.

Still further in accordance with a preferred embodiment of the present invention the transmitter, decoder, accumulator and player repeatedly operate in succession a number of times in order to transmit additional data blocks to the client, thereby upgrading the quality of the audio while it is being replayed.

There is also provided in accordance with another preferred embodiment of the present invention an object movie processing system operative on digital object movie data for encoding the digital object movie, storing it on a server computer and delivering it to client computers on-line upon request including:

an encoder for compressing the digital object movie into a database including a series of encoded data blocks, each block comprising a sequence of encoded frames, with the property that successive blocks when decoded and integrated together provide successively higher bandwidth versions of the object movie for on-line playback;

a storage device for archiving the database on a server computer;

a processing unit for accepting a request by a client computer for on-line delivery of the object movie and determining which data blocks to transmit, so as to accommodate the client bandwidth;

a transmitter for delivering the necessary data blocks to the client;

a decoder for decompressing the data blocks back into object movie data on the client computer;

an accumulator for integrating the data blocks together on the client computer to reconstruct an appropriate version of the original digital object movie; and a player on the client computer for playing the reconstructed digital object movie.

Further in accordance with a preferred embodiment of the present invention the encoder includes a bit-rate controller enabling the user to pre-select the sequence of bandwidths or quality levels for the database.

Still further in accordance with another preferred embodiment of the present invention the transmitter, decoder, accumulator and player repeatedly operate in succession a number of times in order to transmit additional data blocks to the client, thereby upgrading the quality of the object movie while it is being replayed.

There is also provided in accordance with another preferred embodiment of the present invention a panorama processing system operative on digital panorama data for encoding the digital panorama, storing it on a server computer and delivering it to client computers on-line upon request including:

an encoder for compressing the digital panorama into a database including a series of encoded data blocks, each block including a sequence of encoded frames, with the property that successive blocks when decoded and integrated together provide successively higher bandwidth versions of the panorama for on-line playback;

a storage device for archiving the database on a server computer;

a processing unit for accepting a request by a client computer for on-line delivery of the panorama and determining which data blocks to transmit, so as to accommodate the client bandwidth;

a transmitter for delivering the necessary data blocks to the client;

a decoder for decompressing the data blocks back into panorama data on the client computer;

an accumulator for integrating the data blocks together on the client computer to reconstruct an appropriate version of the original digital panorama; and a player on the client computer for playing the reconstructed digital panorama.

Further in accordance with a preferred embodiment of the present invention the encoder includes a bit-rate controller enabling the user to pre-select the sequence of bandwidths or quality levels for the database.

Still further in accordance with a preferred embodiment of the present invention the transmitter, decoder, accumulator and player repeatedly operate in succession a number of times in order to transmit additional data blocks to the client, thereby upgrading the quality of the panorama while it is being replayed.

There is also provided in accordance with another preferred embodiment of the present invention an image processing system operative on large digital image data for encoding the digital image, storing it on a server computer and delivering it to client computers on-line upon request including:

an encoder for compressing the large digital image into a database including a series of encoded data blocks, each block including a sequence of encoded multi-resolution tiles of the image, with the property that successive blocks when decoded and integrated together provide successively higher quality versions of the image tiles;

a storage device for archiving the database on a server computer;

a processing unit for accepting a request by a client computer for on-line delivery of the image and determining which data blocks to transmit;

a transmitter for delivering the necessary data blocks to the client;

a decoder for decompressing the data blocks back into image tile data on the client computer;

an accumulator for integrating the data blocks together on the client computer to reconstruct an appropriate version of the original multi-resolution image tiles; and an interactive viewer on the client computer for displaying the reconstructed image tiles.

Additionally in accordance with a preferred embodiment of the present invention the encoder includes a compression controller enabling the user to pre-select the sequence of quality levels for the database.

Moreover in accordance with a preferred embodiment the encoder operates on a plurality of images forming an animation, and each encoded data block is comprised of multi-resolution tiles from the plurality of images.

There is also provided in accordance with another preferred embodiment of the present invention a method for caching of data which gets transmitted from servers to clients on a central hub within a network, including the steps of:

encoding digital multimedia data into databases including a series of encoded data blocks, each block including a sequence of encoded frames, with the property that successive blocks when decoded and integrated together provide successively higher bandwidth versions of the media for on-line playback;

storing the databases on a multitude of server computers;

managing within the hub requests by client computers for on-line delivery of media stored on server computers in order to determine which data blocks to transmit, so as to accommodate the client bandwidth;

transmitting the necessary data blocks from the server and from the hub to the client;

storing the data blocks delivered by the server in the cache residing in the central hub;

processing within the hub the data blocks it receives;

decoding the data blocks on the client computer;

integrating the data blocks together on the client computer to reconstruct an appropriate version of the original digital media; and playing the reconstructed media on the client computer.

Further in accordance with a preferred embodiment of the present invention the step of managing is performed by:

setting inventory flags to indicate which data blocks are currently stored in the hub.

Still further in accordance with a preferred embodiment of the present invention the step of managing further including the steps of:

communicating with the servers to monitor which media data is outdated;

removing from cache the blocks corresponding to the media data which is outdated; and resetting the inventory flags to indicate that the above blocks are no longer stored in the cache.

Still further in accordance with a preferred embodiment of the present invention the step of processing comprising the steps of:

decoding the data blocks received;

integrating the data blocks together to reconstruct appropriate versions of the original digital media; and encoding the reconstructed media versions into an intermediate database for future transmission to the clients.

There is also provided in accordance with another preferred embodiment of the present invention a proxy system operative on a server/client network for caching of data which gets transmitted from servers to clients on a central hub, including:

an encoder for compressing digital multimedia data into databases including a series of encoded data blocks, each block including a sequence of encoded frames, with the property that successive blocks when decoded and integrated together provide successively higher bandwidth versions of the media for on-line playback;

server communication lines from the servers to the hub for sending data blocks;

client communication lines from the hub to the clients for sending digital data;

storage devices for archiving the databases on a multitude of server computers;

a management unit within the hub to process requests by client computers for on-line delivery of media stored on server computers in order to determine which data blocks to transmit, so as to accommodate the client bandwidth;

a transmitter for delivering the necessary data blocks on the server communication lines from the server to the hub, and on the client communication lines from the hub to the client;

a storage device for saving the data blocks delivered by the server communication lines in the cache residing in the central hub;

a processing unit within the hub for processing the data blocks which the hub receives;

a decoder for decompressing the data blocks on the client computer;

an accumulator for integrating the data blocks together on the client computer to reconstruct an appropriate version of the original digital media; and a player for playing the reconstructed media on the client computer.

Further in accordance with a preferred embodiment of the present invention the management unit operates by setting inventory flags to indicate which data blocks are currently stored in the hub.

Still further in accordance with a preferred embodiment of the present invention the management unit operates by monitoring from the servers which media data is outdated, removing from cache the blocks corresponding to the media data which is outdated, and resetting the inventory flags to indicate that the above blocks are no longer stored in the cache.

Additionally in accordance with a preferred embodiment of the present invention the processing unit comprising:

a decoder for decompressing the data blocks received;

an accumulator for integrating the data blocks together to reconstruct appropriate versions of the original digital media; and an encoder for compressing the reconstructed media versions into an intermediate database for future transmission to the clients.

There is also provided in accordance with another preferred embodiment of the present invention a multi-casting unit (MCU) system operative on a broadcasting network for caching of data which gets transmitted from stations to viewers, including:

an encoder for compressing digital multimedia data into databases including a series of encoded data blocks, each block including a sequence of encoded frames, with the property that successive blocks when decoded and integrated together provide successively higher bandwidth versions of the media for on-line playback;

station communication lines from the stations to the MCU for sending data blocks;

viewer communication lines from the MCU to the viewers for sending data;

viewer receiver units for receiving the data sent by the MCU;

storage devices for archiving the databases on a multitude of station computers;

a management unit within the MCU to process requests by viewers for on-line delivery of media stored on station computers in order to determine which data blocks to transmit, so as to accommodate the viewer bandwidth;

a transmitter for delivering the necessary data blocks on the station communication lines from the station to the MCU, and on the viewer communication lines from the MCU to the viewer receiver units;

a storage device for saving the data blocks delivered by the station communication lines in the cache residing in the MCU;

a processing unit within the MCU for processing the data blocks which the MCU receives;

a decoder for decompressing the data blocks on the viewer receiver;

an accumulator for integrating the data blocks together on the viewer receiver unit to reconstruct an appropriate version of the original digital media; and a player for playing the reconstructed media from the viewer receiver unit.

Further in accordance with a preferred embodiment of the present invention the management unit operates by setting inventory flags to indicate which data blocks are currently stored in the MCU.

Still further in accordance with a preferred embodiment of the present invention the management unit operates by monitoring from the stations which media data is outdated, removing from cache the blocks corresponding to the media data which is outdated, and resetting the inventory flags to indicate that the above blocks are no longer stored in the cache.

Additionally in accordance with a preferred embodiment of the present invention the processing unit within the MCU including:

a decoder for decompressing the data blocks received;

an accumulator for integrating the data blocks together to reconstruct appropriate versions of the original digital media; and an encoder for compressing the reconstructed media versions into an intermediate database for future transmission to the viewers.

There is also provided in accordance with another preferred embodiment of the present invention a method for streaming multimedia data over a network, including the steps of:

encoding the media into a progressive database indexed according to frame and progressive block numbers;

serializing the encoded database;

storing the serialized database on a server;

streaming the serialized database to a client upon request;

creating a mirror copy of the encoded database on the client computer from the data which streams in; and decoding the encoded database on the client computer into a sequence of frames for real time display.

There is also provided in accordance with another preferred embodiment of the present invention a multimedia network streaming system, including:

an encoder for compressing the media into a progressive database indexed according to frame and progressive block numbers;

a sequencer for serializing the encoded database;

a storage device for archiving the serialized database on a server;

a transmitter for streaming the serialized database to a client upon request;

a processor for creating a mirror copy of the encoded database on the client computer from the data which streams in; and a decoder for decompressing the encoded database on the client computer into a sequence of frames for real time display.

There is also provided in accordance with another preferred embodiment of the present invention a system for transmitting model based data representations of three dimensional images over plural transmission links having limited bandwidth, said system including:

a digital data source storing model based data representations of three dimensional images;

an image processor for rendering views of said model based data representations into raster bitmap format;

a digital data receiver receiving said digital data in said raster bitmap format over a one of the plural transmission links having limited bandwidth; and a digital data transmitter operative to transmit the digital data in said raster bitmap format to said receiver over a transmission link having a limited bandwidth in plural blocks which are sequentially transmitted at a rate determined by the limited bandwidth, each block being an incomplete collection of data which includes parts of multiple frames, each frame being viewable in a selectable order by said receiver even when less than all of the plural blocks have been received, receipt of subsequent blocks by the receiver being used to cumulatively improve the quality of the digital data viewed by the receiver.

Further in accordance with a preferred embodiment of the present invention the model based data representations comprise VRML representations.

Still further in accordance with a preferred embodiment of the present invention the model based data representations comprise CAD-CAM representations.

Additionally in accordance with a preferred embodiment of the present invention the image processor is operative to render only views which are selected by a user.

There is also provided in accordance with another preferred embodiment of the present invention a method for transmitting model based data representations of three dimensional images over plural transmission links having limited bandwidth, said system including:

storing model based data representations of three dimensional images;

rendering views of the model based data representations into raster bitmap format;

receiving the digital data in said raster bitmap format over a one of said plural transmission links having limited bandwidth; and transmit the digital data in said raster bitmap format to the receiver over a transmission link having a limited bandwidth in plural blocks which are sequentially transmitted at a rate determined by the limited bandwidth, each block being an incomplete collection of data which includes parts of multiple frames, each frame being viewable in a selectable order by the receiver even when less than all of the plural blocks have been received, receipt of subsequent blocks by the receiver being used to cumulatively improve the quality of the digital data viewed by the receiver.

Further in accordance with a preferred embodiment of the present invention the model based data representations comprise VRML representations, and CAD-CAM representations.

Still further in accordance with a preferred embodiment of the present invention the image processor is operative to render only views which are selected by a user.

The following definitions are employed throughout the specification and claims:

RESOLUTION—The relationship between the number of digital samples per unit of an original and the number of digital samples per unit in a rendered version thereof Specifically, when dealing with images, resolution refers to the relationship between the number of pixels per unit area of an original image or scene and the number of pixels per unit area in a displayed image. Specifically, when dealing with audio, resolution refers to the relationship between the number of samples per unit time of an original sound and the number of samples per unit time in a played sound.

QUALITY—The degree to which a rendered version of an original is faithfuil to the original. Specifically, when dealing with images, quality refers to the degree to which the displayed image is faithful to the original image or scene. Normally this is expressed as the degree to which the approximation of pixel values in the displayed image approaches the correct pixel values in the original image or scene. Specifically, when dealing with audio, quality refers to the degree to which a played sound is faithful to the original sound.

FRAME—A portion of an original which can be independently and interactively manipulated. Specifically, when dealing with images, frame refers to a portion of an image or of a collection of images which can be independently and interactively manipulated. Specifically, when dealing with audio, frame refers to a portion of a sound which is delimited in time and can be independently and interactively manipulated.

BLOCK—A sequentially transmitted collection of partial data which is used to build multiple frames. The frames are built up of one or more sequentially transmitted blocks, whose contents are accumulated. Specifically, when dealing with images, the block contains image data. Specifically when dealing with audio, the block contains audio data.

PARTIAL FRAME—The part of a frame which is contained in a given block.

TILE—A window sized pixel array of a predetermined given size forming part of an image. For example, tiles partition an image into a plurality of arrays, each of which contains an identical number of pixels.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
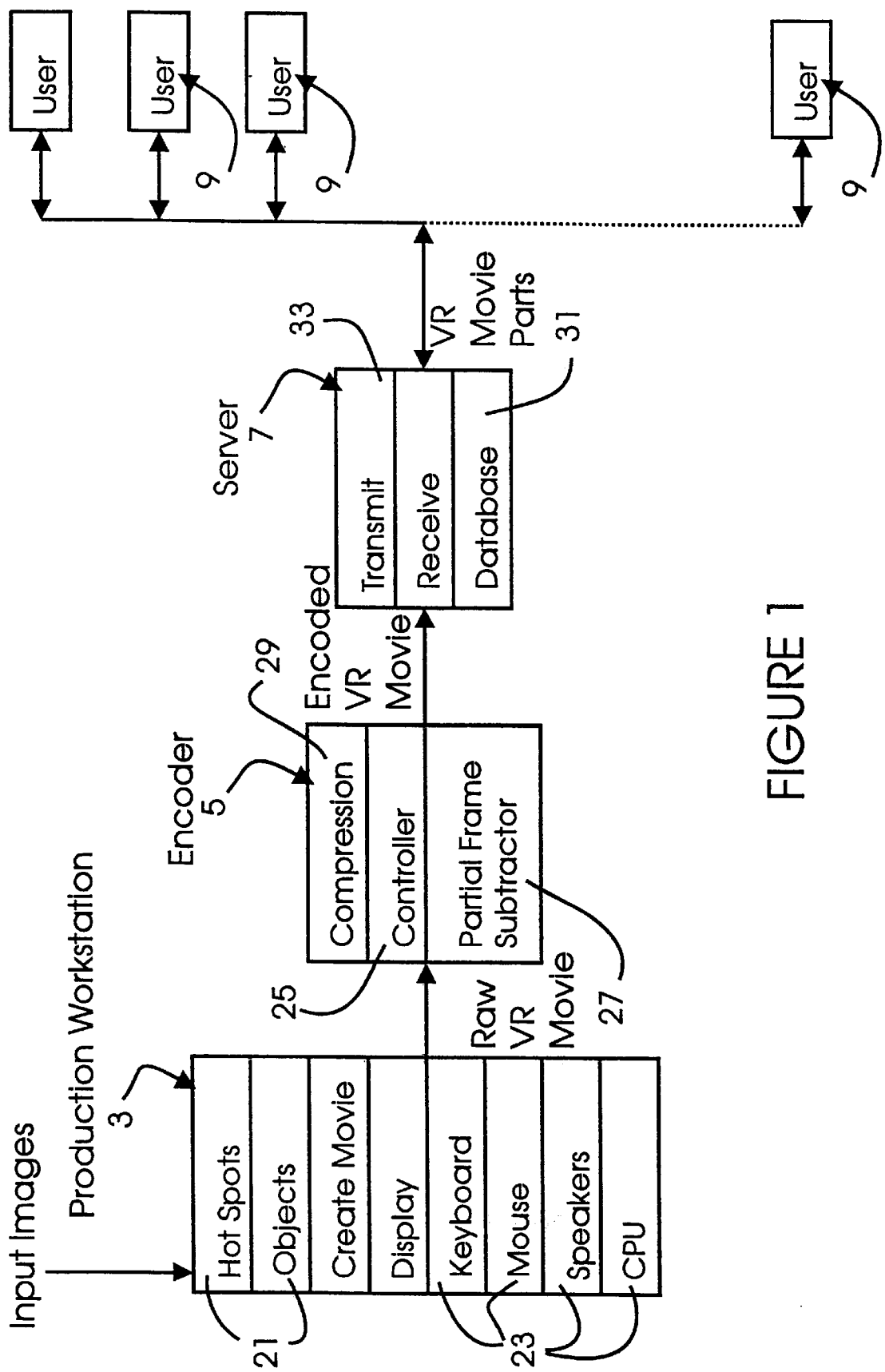
FIG. 1 and FIG. 2 are simplified block diagrams illustrating a system for scalable representation of multimedia data for progressive asynchronous transmission, constructed and operative in accordance with a preferred embodiment of the present invention.

The preferred embodiments of the present invention may be better understood given the following technical and theoretical explanation.

The present invention provides a novel method for representing multimedia data. The invention provides a scalable representation, so that the data can be asynchronously transmitted to clients having different bandwidth connections, played on-line almost immediately after the transmission begins, interactively controlled, and also progressively upgraded as it is replayed.

Although the present invention is described hereinbelow with particular reference to image data, it is to be appreciated that it is applicable also to non-image data, such as audio data.

When addressing bandwidth limitations, it is natural to think in terms of data rates, or velocities. Video players, for example, play at standard rates such as thirty frames per second (fps), and require the images for display to be available at this rate. If the images are already stored on a local hard disk, then all that is necessary is disk access, which is very fast. On the other hand, if the images are streamed in from a server, then in order for on-line playback to be possible before a full download is finished, the rate of transmission must be great enough to supply the frames at thirty fps. This does not mean that the network link has to transmit the data equivalent to thirty full frames every second. Due to compression, it suffices if the network transmits thirty compressed frames every second.

For example, if the compression achieved is 10:1, then it suffices to transmit at a rate of three fps, provided that the client CPU can decompress thirty compressed frames into full frames every second. In fact, compression is the mediator between the video player and the bandwidth. The player does not slow down when bandwidth is low; rather, the compression ratio has to be greater. Should a bottleneck arise, and a frame is not available when the player needs it, then the player simply skips that frame, but continues to expect frames at the thirty fps rate. The video can be preset at the outset for lower rates than thirty fps, but not much lower, since slow video playback breaks the continuity between frames, and thus loses the effect of motion.

Thus, realizing that higher compression means lower quality, it can be appreciated that users having high bandwidth connections can receive high quality video for on-line playback, and users having low bandwidth connections receive low quality video. In a non-scalable setting, it is thus necessary to prepare different compressed media files for each playback rate and bandwidth combination. For example, four different versions of the media could exist for (a) 24 fps playback, 14.4 Kbs bandwidth, (b) 24 fps playback, 28.8 Kbs bandwidth, (c) 30 fps playback, 14.4

Kbs bandwidth, (d) 30 fps, 28.8 Kbs bandwidth. As described below, using the present invention a single media file can be used to accommodate all four of these combinations.

In the present invention, the media data is comprised of m frames $F_1, F_2, \ldots, F_m$. A frame can be, for example, an individual frame of a movie sequence, a piece of a panoramic view, an individual segment of an audio signal, or even a sub-sampled version of a large still image. It can also be a group of such frames, such as for example, a group of inter-frames between key frames in a video segment, in a case where an H.263 codec is being used. In broad terms, frames are units of interactivity. For example, in object movies where interactivity means frame advance, a frame unit is an individual still image, whereas in gazing applications where interactivity means zooming in and out, the frame units are multi-resolution tiles.

The representation encodes the media data into n data blocks $B_1, B_2, \ldots, B_n$, preferably of roughly equal size. Each encoded data block $B_1$ contains m compressed frame units $F_1^j, F_2^j, \ldots, F_m^j$. Thus it is appreciated that the database is arranged in two dimensions, corresponding to blocks and frames. The dimension used for blocks is for achieving progressiveness, and the dimension used for frames is for achieving interactivity. The frame data can be transmitted in a selective order, but the blocks must be transmitted in sequence, since they build cumulatively. This is an essential feature of the subject invention.

Data block $B_1$ is used to deliver the media at the lowest bandwidth, say $f_1$ Kbs; data blocks $B_1$ and $B_2$ when integrated together, are used to deliver the media at bandwidth $f_2=2f_1$ Kbs; and in general, for $1 \leq k \leq n$, data blocks $B_1$, $B_2, \ldots, B_m$, when integrated together, are used to deliver the media at bandwidth $f_k=kf_1$ Kbs. Each higher bandwidth version delivers a higher quality rendition of the media. In this way, the representation can accommodate multiple clients connecting to the network with different bandwidths. Moreover, a client connecting with bandwidth $f_1$ who has downloaded data block $B_1$ and played the media, can continue downloading block $B_2$ in background, since the bandwidth has been freed, and thereby achieve the same quality as bandwidth $f_2$ the next time the media is replayed.

Within each block the frames can be accessed randomly and delivered selectively, so that the user can vary the quality level among the frames. For example, a viewer who wants to gaze at frame #3 may instruct the database to send frame #3 data from the first ten blocks, but only one block of data for all of the other frames. The viewer selection is carried out interactively, through the use of keyboard presses and mouse clicks, as the media is being played. Whereas for some applications it may be most natural to transmit the entire blocks in sequence, for other applications it may be more effective to first deliver as much data as possible for specific frames at the expense of lowering the quality of other frames. The two dimensionality of the database, together with its interactive accessibility, gives the user complete control over the transmission sequence.

The scalable representation that is the subject of the present invention is embodied in a production tool which enables the producer to control the bandwidth parameters $f_k$, or equivalently, the qualities of the media versions obtained by integrating blocks $B_1, B_2, \ldots, B_k$. In general, it is not necessary that the blocks be of equal size, nor that the frequencies $f_k$ be given by $kf_1$, although this is the preferred embodiment. The production tool also enables the producer to control the final quality of the highest bandwidth version, or equivalently, the total number, n, of data blocks in the representation.

In contrast, if the media data representation is not scalable, but is encoded instead for a specific bandwidth f, then only clients with bandwidth f or greater can play the media on-line as it is being downloaded. A client with a lower bandwidth than f would have to download the entire data stream to memory in order to begin playback, which can take a great deal of time on account of the large file sizes typically used in multimedia production. A client with a higher bandwidth connection than f would not be able to take advantage of it to receive higher quality media. Moreover, there would be no means of upgrading media quality, even for clients with high bandwidth connections, other than to transmit an entirely new data stream from the server side, and discard the previously downloaded data.

Applications of the invention include, inter alia, scalable audio and video transmission, video previewing, progressively rendered object movies and panoramas, large still images, efficient proxy or multi-casting unit (MCU) management for web and other hubs, and VRML transmission, as described hereinafter in greater detail.

Scaleable Audio Transmission:

Digital audio data can be progressively encoded into a scalable database for asynchronous transmission at different bandwidths. A client connected with a low bandwidth line can receive a low quality version of the audio, which can be played back on-line at the low bandwidth as the data streams in. After the audio is played, additional data blocks can continue to be received and integrated with the previous blocks, so that the audio is upgraded to higher quality for replay.

Scaleable Video Transmission:

Similar to the description above for the audio transmission, digital video data can be encoded into a scalable database for asynchronous delivery and progressive quality upgrade.

For certain time-based video systems, there is disclosed a novel way to incorporate the scalable database so that progressiveness and immediate playback can be achieved, even in a single-play mode. Specifically, this applies to video systems with two time scales, such as is present in the Apple QUICKTIME® movie player. The first time scale (hereinafter referred to as the "major scale") is used to advance from one frame to the next, based on major units of time. The second time scale (hereinafter referred to as the "minor scale") is a sub-division of the major scale into smaller time units, and is used to incorporate small changes or fluctuations into the frame being displayed. For example, the major scale can be advancing through a movie of a bird flying and the minor scale can be adding fluttering to the bird's wings. The advantage of such a two-scale player is that the decoder, which does the intensive processing to supply the frames, need only run at the slower rate, e.g. 3 frames per second (fps), governed by the major scale, whereas the viewer, doing the less intensive processing, is playing at the faster rate, e.g. 30 fps, governed by the minor scale.

The subject invention can be incorporated into a system having two time scales as described hereinabove by using the minor scale in a way different from the way that was originally intended. Instead of being used to introduce fluctuations, it is used to display progressively rendered versions of a frame. At each minor time unit, the player displays the latest version available of the frame indexed by the major scale. For example, suppose there are ten minor time units within the major time unit during which frame #4 is to be displayed. At the first minor time unit, the player initially displays the version of frame #4 which it has available from the first data blocks already processed. As additional blocks of data are accumulated and higher quality versions of frame #4 become available, the player displays those frames at successive minor time units. This continues for ten minor time units, until the next major time unit, at which time frame #5 is to be displayed. The cycle then repeats, and the version of frame #5 which is already available is initially displayed at the first minor time unit. Thus it can be seen that progressiveness can be achieved by interjecting into the minor scale, the versions of the frames obtained by accumulating successive blocks.

For the user to be able to view the video immediately, without waiting for the entire file to download, the production tool must store the encoded video in the order of successive blocks. Each partial frame must be handled as if it were an entire frame. That is, the production tool must treat the movie as if there were a total of m·n distinct frames being encoded. On the other hand, each frame is sent only once to the codec for encoding, and is returned as a series of encoded partial frames. Thus it is necessary to post-process the encoded data file, to rearrange the data items from a frame dominated order to a block dominated order. This rearrangement process is referred to as "flattening" in the art.

The player in turn, however, must know that although it is receiving what appears to be m·n data items, there are really only a total of m frames. It must decode and accumulate every successive sequence of m data items with the previous ones, to update the frames. The combined effect of the flattening on the production side and the player's interpretation on the client side enables seamless integration of the scalable progressive database within a non-progressive video interface. That is, the incorporation of progressive blocks does not require any modifications to the existing interface.

Video Previewing:

When encoding digital video data into a scalable database, the first data blocks can be used to generate a preview of the video, restricted to selected frames. The preview can be played back by the client almost immediately after the streaming begins. Moreover, additional data blocks received are integrated with the data blocks from the preview, to form full view versions of the video.

Object Movies:

Advertising agencies are using object movies to produce interactive 3-D virtual reality presentations of merchandise on the Internet. The user can rotate and zoom the 3-D object, and examine it from different viewing angles. Using the methodology of the current invention, object movies can be progressively encoded so that the viewer can download and begin playing them almost immediately after the streaming begins. Initially the movie will scale to a quality commensurate with the bandwidth of the user's network connection, but as the data blocks are received and the user interacts with the movie, additional data blocks are delivered and integrated with the previous blocks, resulting in a higher and higher quality movie. An important feature of the invention is that, regardless of bandwidth, the user can begin playback and interaction almost immediately, and does not need to wait for the complete download, as the first version of the movie delivered scales itself to the native bandwidth. As playback continues additional data streams in the background and the movie version is upgraded to higher and higher quality.

Panoramas:

Panoramas are very large images which the user cannot view in their entirety, but rather sees within a restricted viewing window. By panning in various directions, and zooming in and out, the user navigates through the panorama. The continuous change in viewing window gives the effect of movement within a scene. Similar to the description above for object movies, panoramas can be progressively encoded so that the viewer can download and begin navigating through them almost immediately after the streaming begins. Initially the panorama scales to the client bandwidth, and after the first data blocks are received, additional data blocks are streamed in background while the panorama is playing, to provide higher and higher image quality.

Large Still Images:

Although large high quality still images are not composed of frames in the conventional sense, the large sizes of the image data files makes the present invention an effective means for interactive on-line viewing. The frames can be small image tiles within the full image at different resolutions, the smaller tiles having higher resolution than the larger ones. The locations of the tiles can be marked as hot spots. When the viewer clicks on a hot spot within a specific tile, the database delivers that tile at a higher resolution, giving the effect of a zoom in. Within the higher resolution tile there can be more hot spots, and the zooming can continue through the database.

As a simple example, the first frame within a data block may contain the full image sub-sampled by 4:1, for example, in each dimension. The next set of frames within the data block may contain (some subset of) the four quadrants of the full image sub-sampled by 2:1 in each dimension. The next set of frames within the data block may contain (some subset of) the sixteen quadrants within the above four quadrants at the original resolution. A viewer could see the 4:1 reduction of the original image (the first block), click on one of the quadrants and then see that quadrant at a 2:1 reduction (a frame from the second set), and click further on one of its quadrants and then see it at full scale (a frame from the third set).

Efficient Proxy/MCU Management:

Proxies are large storage devices, located as hubs within networks, used as large caches for data being delivered from servers to clients. Similarly MCUs are large storage devices used as caches for data being delivered from broadcasting stations to viewers, such as cable TV. As data is streamed from servers to clients or from broadcasting stations to viewers upon request, the proxy or MCU stores the data in a central hub so that it is available for delivery at a high bandwidth if requested again by any of the clients connected to the hub. It plays a similar role to paging files on a local computer disk, but on a much larger scale and for a much larger clientele.

The scalable representation of the subject invention is particularly well suited for proxies and MCUs which operate in asynchronous environments. Server/client connections and broadcast transmissions can be of many different bandwidths, and so the proxy or MCU can be accumulating versions of the same multimedia data corresponding to different qualities. Without scalability these versions are all independent of one another, and cannot be combined to achieve quality levels other than those originally preset or combined to save space. Using the scalable representation of the subject invention, the proxy or MCU can be optimized to cache the various progressive building blocks. This affords great flexibility in being able to create versions of different quality levels, and reduces the space requirements.

As a simple example, a first user with a low bandwidth connection $f_1$ to the server, who demands a multimedia file, downloads data block $B_1$, which is then also saved to cache on the proxy, and the user receives a low quality version (quality level 1) of the media. A second user with a higher bandwidth connection $f_2$ to the server, who demands the same multimedia file, can download data blocks $B_2$ and $B_3$ from the server, and can access block $B_1$ directly from the proxy. The three data blocks are integrated and the second user receives a very high quality version (quality level 3) of the media. Data blocks $B_2$ and $B_3$ would then also be stored on the proxy. A third user with a direct connection to the proxy of bandwidth $f_2$ who now demands the same multimedia file, can receive the high quality version (quality level 2) comprising of blocks $B_1$ and $B_2$ directly from the proxy. Without a scalable representation it would not be possible for the second user, with a bandwidth connection of $f_2$, to receive a quality level 3 version corresponding to the higher bandwidth $f_3$ nor for the proxy to deliver to the third user a version at a quality level different from those directly available in its cache. Moreover, without a scalable representation the proxy memory required to cache the $f_1$, $f_2$ and $f_3$ versions would equal the size of six data blocks, rather than three. It can thus be seen that the proxy or MCU inherits the scalability from the servers, giving it a great deal more flexibility in its media delivery to the clients than would be possible in a non-scalable environment.

VRML Transmission:

Virtual reality modeling language (VRML) is a descriptive language for representing and rendering three-dimensional objects. The objects are modeled as collections of polygonal elements, the description of which forms a VRML database. Depending on the viewing parameters, the individual elements are processed and the desired view of the object is rendered into a raster bitmap for display. The VRML representation is rich enough to encapsulate all possible views of the object. In fact, there is an infinity of possible variations in viewing parameters. A user interacts with the VRML object by adjusting viewing parameters, through mouse clicks and keyboard presses. VRML was first popularized by Silicon Graphics. Their top Iris workstations, for example, can render on the order of a million polygonal elements per second. VRML images are characterized by their sharp photo-realistic attributes.

The present invention can be applied to efficiently deliver VRML imagery over a server/client network, for on-line interaction. Within the VRML environment itself, two problems arise when transmitting VRML databases over a network for on-line interaction. First, there is the bandwidth limitation, which inhibits the rate of transmission. Second, there is the intense processing on the client side, necessary to render the many polygonal elements into a bitmap for viewing. It would be preferable to have the server (typically a more powerful computer) do the rendering, but then it would be necessary to store rendered bitmaps of every possible set of viewing conditions—a feat that would require on the order of terabytes of disk space.

The present invention can be used to mitigate the problem by allowing the rendering to be done on the server computer without requiring enormous memory, and yet enable the client to freely interact with the VRML object in an on-line interactive setting. This is one of many examples involving real-time encoding. The invention operates by receiving the viewing parameters from the user, rendering the corresponding image on the server into a raster bitmap image, encoding the bitmap into progressive partial frames and inserting them into a two-dimensional server database. The encoded data within the server database is continually streamed from server to client, enabling the client to begin viewing a low quality image as soon as the first partial frame data arrives. As the user navigates through the VRML, additional bitmaps are rendered, encoded and inserted into the server database. Whenever the user re-traces steps, so that the viewing parameters are the same as those selected at some previous stage, the server does not need to render the same bitmaps again. Rather, the streaming simply continues in background, and the quality of the image on the client side is enhanced as additional partial frames are integrated. Similarly, if the user stays focused on a single view, then the bitmap being displayed is enhanced as additional partial frames stream in. Once all of the partial frames are integrated, the image has the same sharp photo-realistic quality as is characteristic of VRML images. On the other hand, the user does not have to wait for all of the data to arrive in order to interact with the object, nor does the client computer have to do the intensive processing to render the VRML database into bitmaps.

Reference is now made to FIG. 1 which shows a block diagram of a system for providing on-line virtual reality (VR) movies. The system includes a production workstation 3 for receiving input images and processing same, as will be described hereinafter. Such input images may be constituted by photographs which are scanned into the workstation. The output from production workstation 3, being a raw VR movie, is fed into an encoder 5 for preparing the movie for transmission and in turn, applied to a server 7 essentially used for storage and transmission of the movie to clients, namely, subscribers or user units 9.

Figure 2:
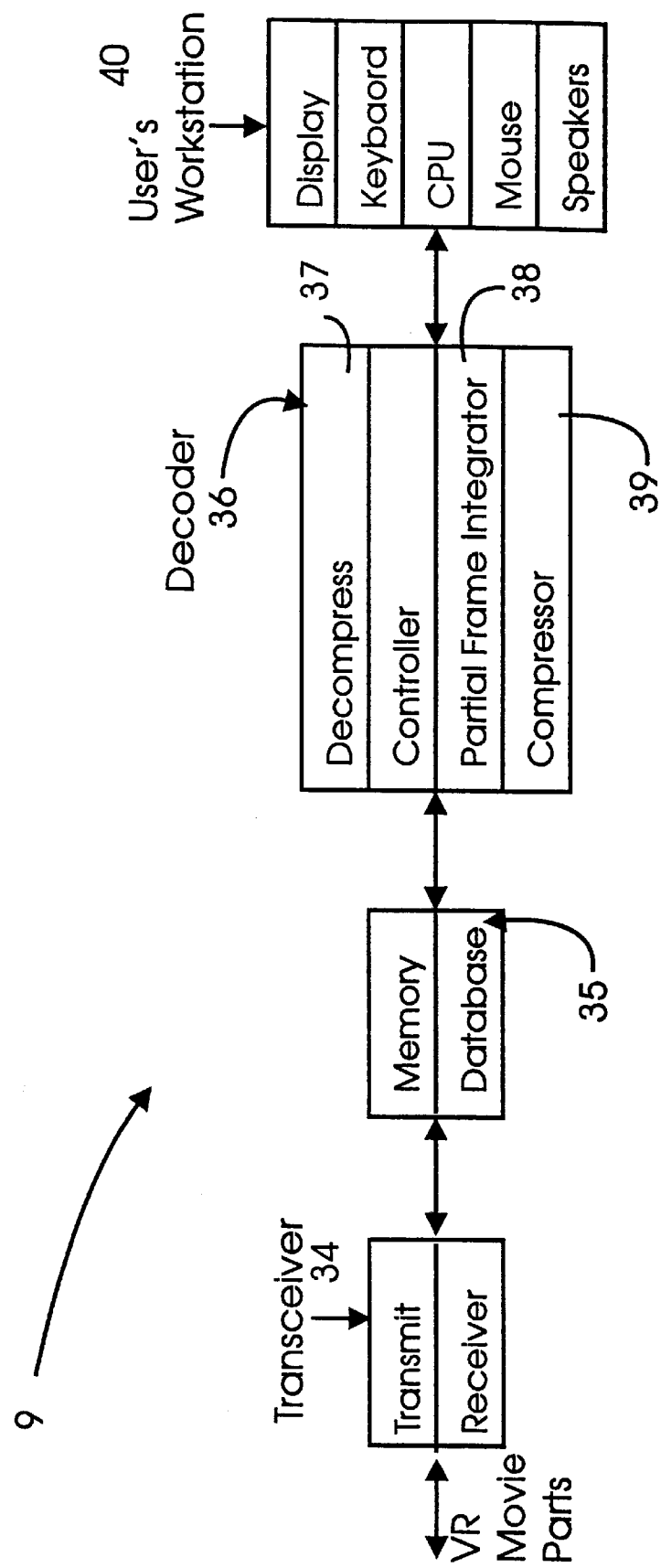

Reference is now made to FIG. 2, which shows user unit 9 of FIG. 1 in greater detail. Seen is a transceiver 34, an asynchronous memory/database 35, a decoder 36 and a user's workstation 40.

Typical operation of a preferred embodiment of the present invention is now described with reference to FIGS. 1 and 2. Selected images are introduced in production workstation 3 in which the VR movie is produced in accordance with a certain script. The producer at the workstation determines the number and size (for example, in bytes) of the partial frames and also defines the various available interactions between the frames by defining hot spots and objects at 21, using auxiliary standard devices for producing movies, such as a keyboard, a mouse, speakers and a CPU all designated by 23. The product obtained is a raw VR movie, which is a complete VR movie that has not been reformatted for transmission. The preparation of the movie for transmission is effected in encoder 5 where partial frames are generated through an iterative process.

The partial frames are generated by encoder 5 as controlled by the controller 25, as follows A partial resolution frame or a partial resolution slice of each frame of the VR movie sequence is generated. One example of such a partial resolution frame is sub-sampled scan lines, e.g., the removal of every $10^{th}$ line of a 150 line frame or a compression encoded frame, which partial resolution results in a blurry display. The partial resolution frame is then subtracted from the original frame by a partial frame subtractor 27, yielding a residual frame or a remainder frame. This process can be repeated on the residual frame, generating a second partial resolution frame. The procedure is also repeated time and time again, until the number (which is determined by the producer) of partial resolution frames is generated. The net result is a set of partial resolution frames that can be recombined into the original full resolution frame.

When this process is completed on each frame of the sequence, the partial resolution frames are transmitted. The order of transmission follows the script given by the producer, and commonly, the first partial resolution frame of each frame is transmitted, followed by the second partial resolution frame, and so on. This sequence of transmission allows for the whole sequence to be viewed in a partial resolution format that progressively comes into focus.

Partial resolution frames may be optionally compression encoded, possibly taking into account similarities between various frames. This is effected in the compressor 29.

Encoded and compressed VR movie parts are passed to a server 7 where the movie parts are stored in a database 31 and transmitted to a user's unit 9 part by part, by means of a transceiver 33.

As seen in FIG. 2, a user's transceiver 34 receives movie parts and transmits requests for additional information. A user's database 35 is progressively updated with requested images or, alternatively, may be progressively updated by the server 7. User's database 35 functions asynchronously, supplying the frames to the user via a decoder 36 by request independent of data transmission. Upon receiving the frames, the decoder initially decompresses the frames as indicated at 37 (if compression took place) and then decodes and recombines them by means of a partial frame integrator 38. Following this, the partial frames are stored in the user's database where the frames may be stored in a compressed format, effected by a compressor 39. A user's workstation 40 enables the user to view and interact with the VR movie. The user utilizes the workstation for sending requests for images to the decoder which retrieves (and decompresses, if necessary), the images from the user's database and sends requests for particular images which may not yet have been transmitted to the server database. Furthermore, the user's workstation actuates any script produced in the production workstation 3. Hence the user's workstation also includes the standard devices included in the workstation 3 and designated by the number 23 (FIG. 1).

As a preface to the explanation of the remaining figures, it is important to understand that the progressive scalable database which is a subject of the current invention preferably is stored in three databases within the server/client system.

Figure 3A:
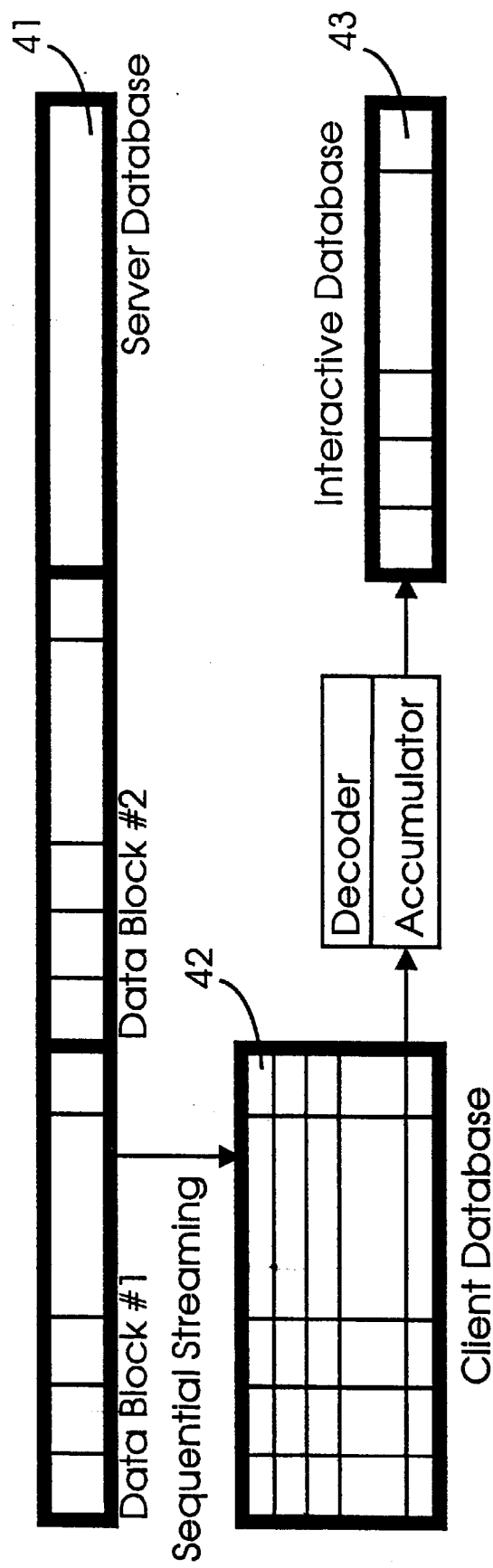
FIG. 3A is a simplified schematic diagram of the database structure of the present invention which includes three databases, embodied within the client-server system of the present invention.

Reference is now made to FIG. 3A which shows a preferred database structure in accordance with a preferred embodiment of the present invention. It is a particular feature of the present invention that three databases are employed, a server database 41, which is arranged in a serial form, containing multiple data blocks, each including multiple partial frame data, a client database 42 which is arranged in a two dimensional structure, conceptually illustrated in FIG. 3B and an interactive database 43 which contains a single data block including multiple frames, which is dynamically updated from the client database 42. In an alternative embodiment of the invention, wherein extremely high processing speeds are available at the client, the client database could be eliminated.

It is a particular feature of the present invention that interactive data streaming is provided. The use of three databases as described above enables interactive data streaming to be achieved in an efficient and cost effective manner. The use of databases having a two-dimensional structure greatly simplifies the data processing.

Server database 41, which is archived on a server constitutes a first database of the progressive scalable database. The server database 41 includes a plurality of data blocks in encoded form. As seen particularly in FIG. 3B, the progressive scalable database is two-dimensional in nature. It has a progressive dimension indexed by block number, and an interactive dimension indexed by frame number but it is serialized for streaming and can only be accessed sequentially. Server database 41 is streamed from server to client via the transmission and buffering protocol of the Internet browser.

Client database 42, the second database, is built up on the client side as the information streams in, to mirror the server database 41. Client database 42 is truly two-dimensional, with random access capability within the data blocks. The data blocks within it are also in encoded form.

Interactive database 43, the third database, is created by decoding the data from the client database 42. This interactive database 43 is one-dimensional, and contains only one sequence of frames, but it is dynamically updated. As additional block data is integrated, these frames are updated, with the previous versions over-written.

When a frame has been updated, the encoded frame used to update it is deleted from client database 42. Thus while interactive database 43 is being created and updated, client database 42 is being deleted. Since the updating of the frames is asynchronous, however, client database 42 typically contains frames from many different blocks simultaneously at any point in time. In essence, then, the progressive dimension of the database is being realized through a time dimension in interactive database 43.

Interactive database 43 is controlled by the user interface through keyboard presses and mouse clicks. The creation and update of interactive database 43 from client database 42 is done in background time slices, while the client CPU is idle. Interactive database 43 may store the frames in either raw bitmap form or in an intermediate compressed form, as long as the intermediate compression is such that the frames can be decompressed in real time for display. An advantage of using an intermediate compression is to confine interactive database 43 to internal RAM, which has fast access time, rather than swap to hard disk memory, which has slow access time. The swapping in itself is a drain on processing speed.

When the user requests a frame to be displayed, interactive database 43 displays that frame immediately, if it is available. In case the frame is not available, interactive database 43 passes a message back to client database 42 requesting that frame. Client database 42 accesses the specific frame requested from its first encoded data block, if it is available, and sends it to the decoder for decompression and integration, and subsequent incorporation into interactive database 43. Once a frame is incorporated, interactive database 43 displays the frame at once. If client database 42 has not yet received the requested frame from the server stream, then it must wait until the encoded frame arrives, since the streaming is sequential. If the streaming were instead random access, client database 42 would be able to directly request the specific frame it needs from server database 41.

In summary, the server database is two-dimensional but serialized for sequential streaming; the client database is two-dimensional with random access within blocks; and the interactive database is one-dimensional but dynamically updated. In the interactive database, the progressive database dimension is actually being represented as time rather than space. This "three database strategy," using three different databases: (i) two-dimensional serialized, (ii) two-dimensional, (iii) one space and one time dimension, is a key to the present invention, and to the discussion of the figures in detail which follow.

For each of these three databases, the progressive dimension manifests itself in a different way. Within the server database, progressiveness means quality. The encoder builds the blocks of the database based on achieving the best quality at given bit rates. Within the client database, progressiveness means cumulative integration. Progressiveness within the client database is a computational property. The accumulator on the client computer integrates frames from successive blocks with those from previous blocks. Finally, within the interactive database, progressiveness means time. As time progresses, the frames are dynamically updated as more blocks have been accumulated. The transmission from the server database to the client database is streamed serially, and this is where the progressive dimension is effectively converted from "space" to "time."

The progressiveness manifests itself in bandwidth during the streaming. The transmission from the client database to the interactive database is asynchronous. The client database is being created in the background while the interactive database is being played, and the former acts as a buffer for the latter. Moreover, the client can interact with the media almost immediately after the streaming begins, and does not have to wait for the client database to be constructed entirely.

The interactive dimension of the database corresponds to whatever functionality the user interface allows. For example, it can manifest itself as frame advance for videos and object movies, navigating for panoramas, and gazing for large still images.

Figure 3B:
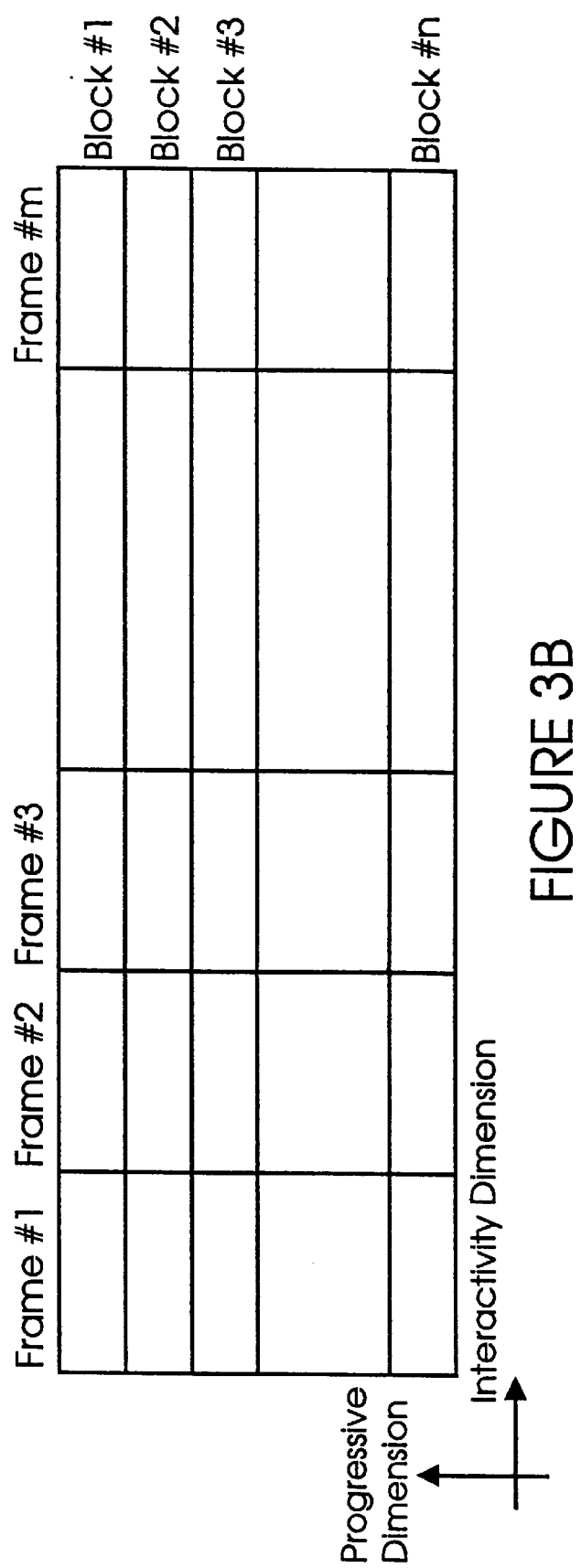
FIG. 3B is a simplified diagram of a database structure particularly useful in the client database of FIG. 3A, illustrating its two-dimensional nature.
Figure 4:
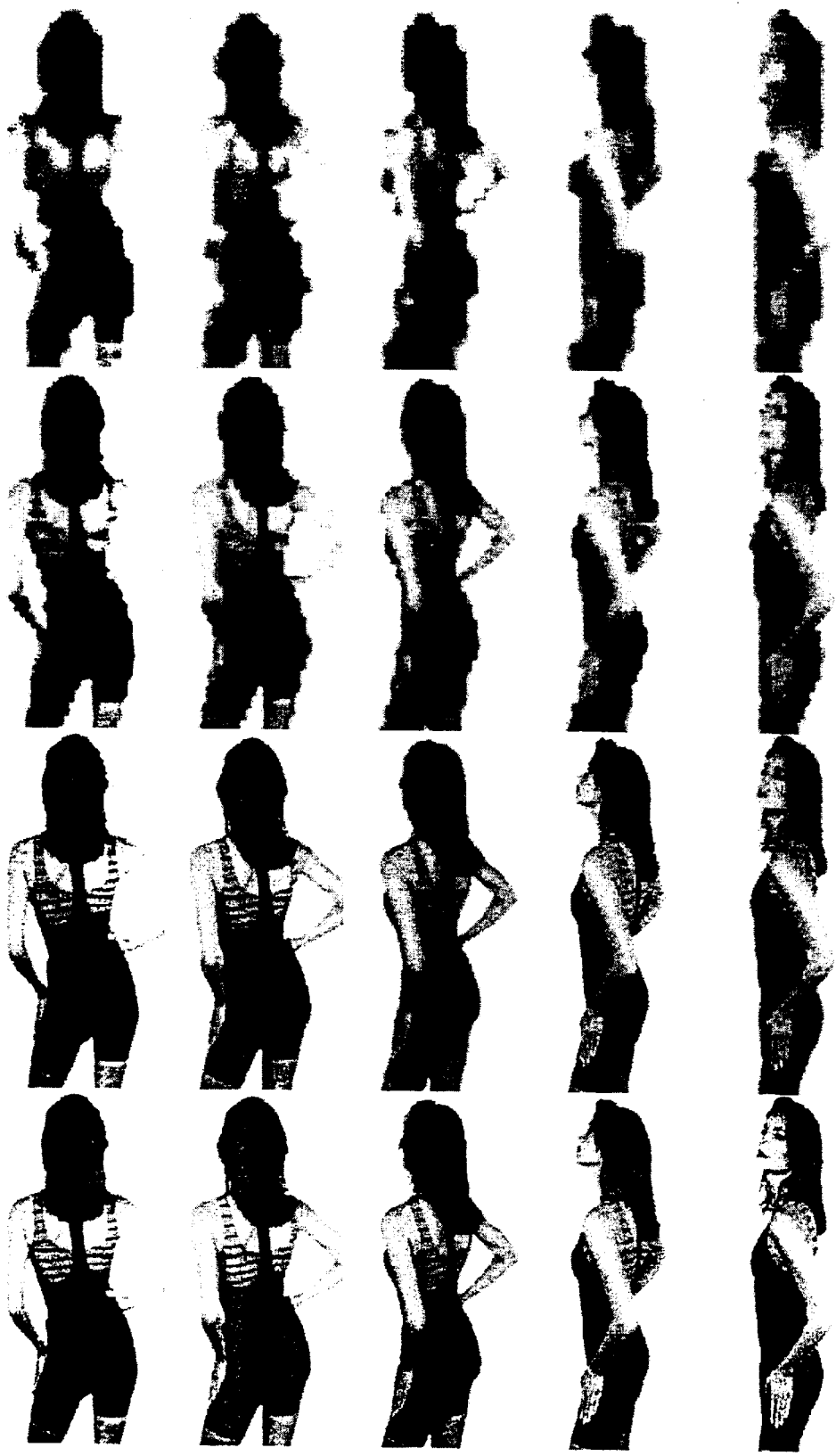
FIG. 4 is an illustration of the operation of a preferred embodiment of the present invention.

Reference is now made to FIG. 4 which illustrates one application of the three database structure described hereinabove in FIGS. 3A and 3B. For simplicity, referring additionally to FIG. 3B, each image in FIG. 4 is built up of corresponding partial frames in successive data blocks which are cumulatively received. Thus, for simplicity, one may consider the five images in a first horizontal row, to correspond to five interactively viewable frames in a first block of data, each successive frame typically illustrating a successive position of an imaged model.

Considering each successive horizontal row in FIG. 4, it can be seen that the quality of the images improves successively from the top row to the bottom row. This corresponds to the quality improvement sensed by a viewer as successive blocks of data are incorporated in the information made available to the viewer.

It is appreciated that in accordance with a preferred embodiment of the present invention, a limited bandwidth user first receives the first row of images and is immediately able to interact therewith. Over time, depending on the bandwidth available to that user, successive data blocks are received, each cumulatively enhancing the quality. It is a particular feature of the invention that during receipt of successive blocks of data, the user is able to fully interact with the images.

Figure 5:
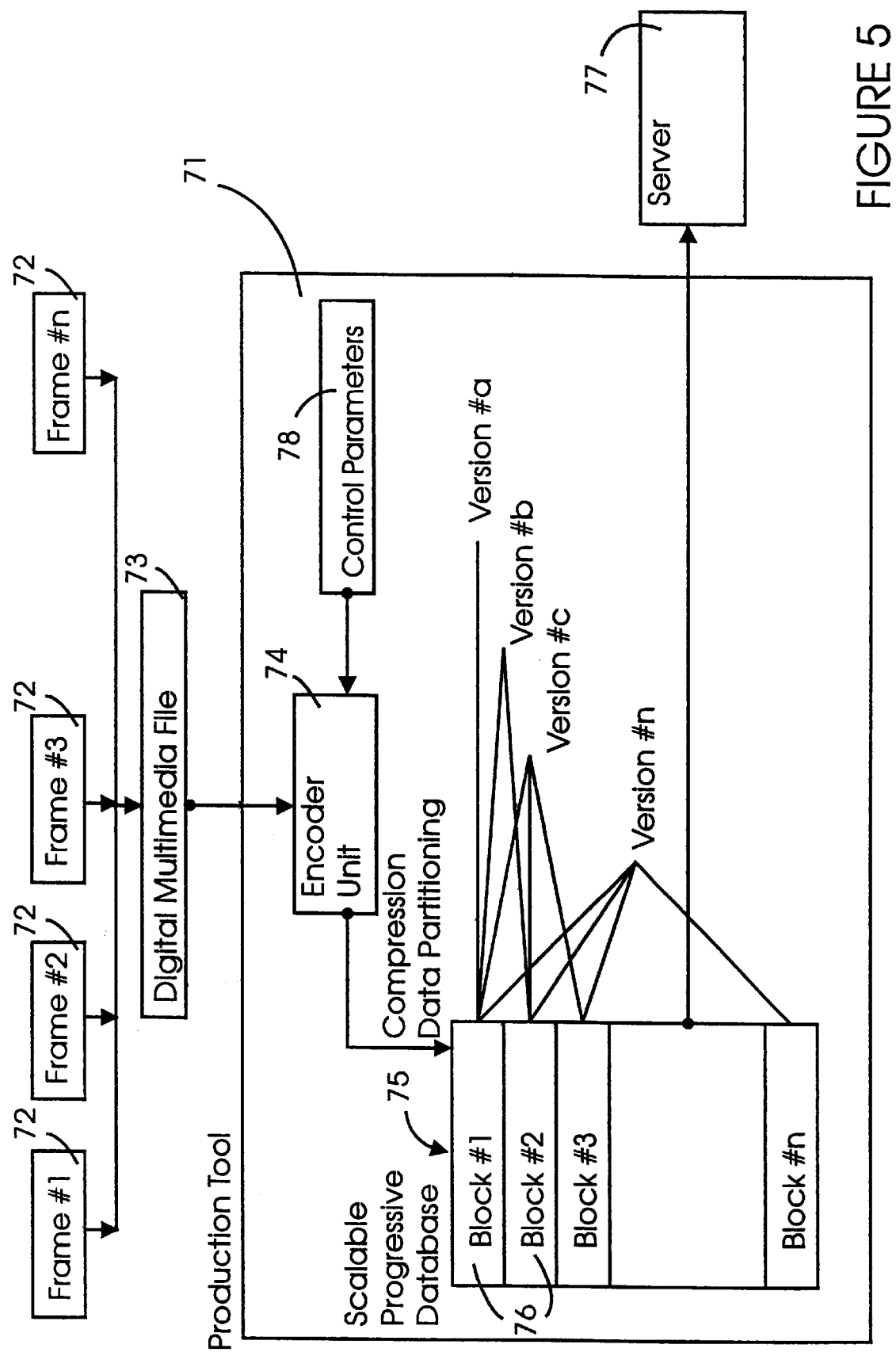
FIG. 5 is a simplified schematic diagram of a production tool for converting a digital multimedia file into a progressive scalable database representation for storage on a server computer in accordance with a preferred embodiment of the present invention.

Reference is now made to FIG. 5 showing a production tool 71 which accepts as an input a sequence of original digital frame units 72, integrated into a digital multimedia file 73. The production tool 71 includes an encoder unit 74 which operates by partitioning and compressing the digital multimedia file 73 into a scalable progressive database 75 comprised of data blocks 76. Successive blocks combine together to form higher bandwidth versions a to n of the media. Database 75 is stored on server 77. The production tool 71 enables the producer to control the bandwidth or quality granularity through control parameters 78. These parameters are used to calculate the data block sizes and compression settings within encoder unit 74.

Figure 6:
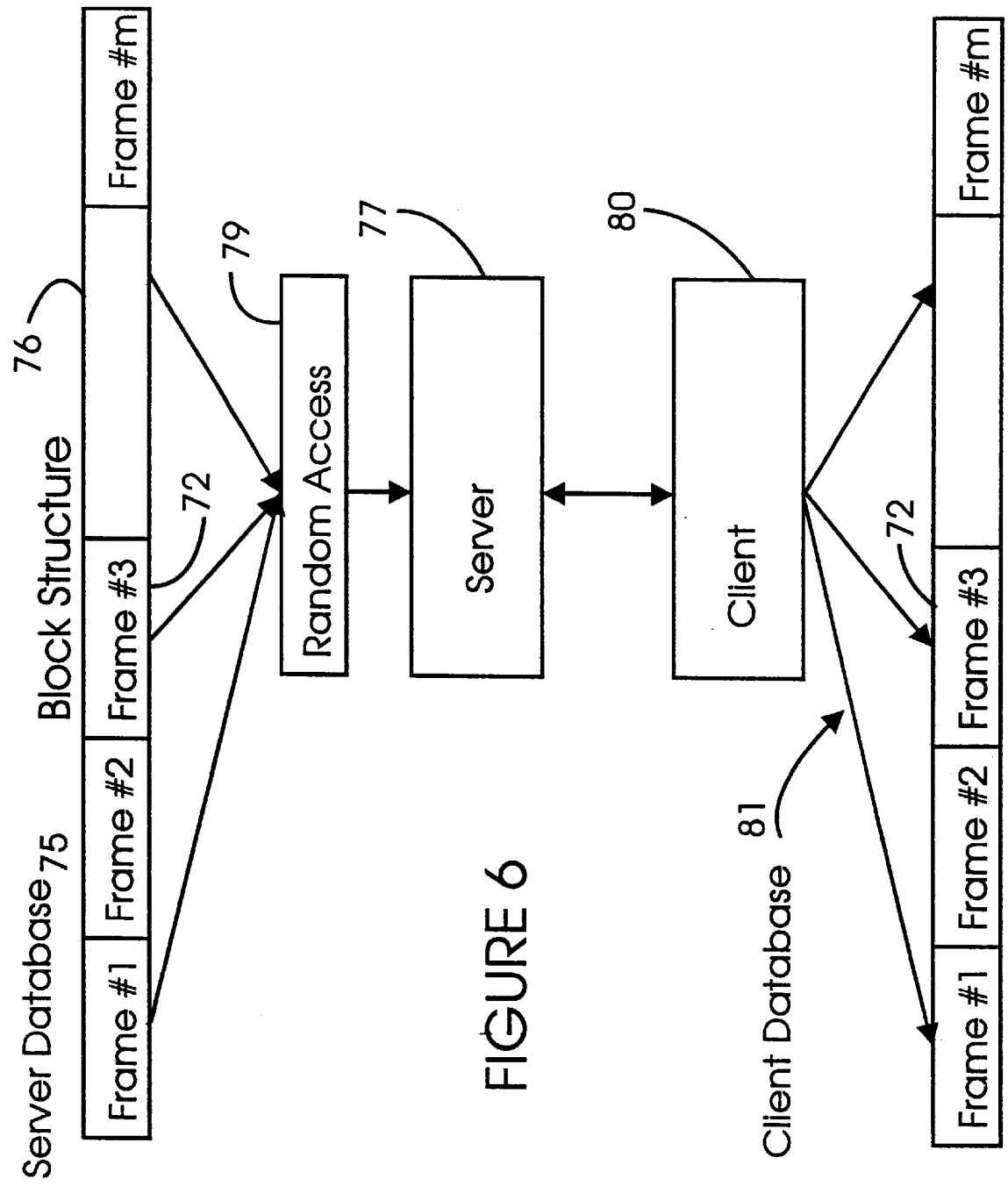
FIG. 6 is a simplified schematic diagram of the structure of a block within the server database, partitioned into frames which can be accessed randomly in accordance with a preferred embodiment of the present invention.

Reference is now made to FIG. 6 showing the structure of data block 76 in scalable progressive database 75. Where a random access server is available, selective encoded frames 72 from block 76 are accessed at 79 on the server 77 database, based on interactive requests coming from the client. The encoded frames are transmitted from server 77 to a client computer 80 and integrated within client database 81, to mirror server database 75. It is appreciated that both sequential and random access servers may be advantageously employed in the present invention, although random access servers are preferred.

Figure 7:
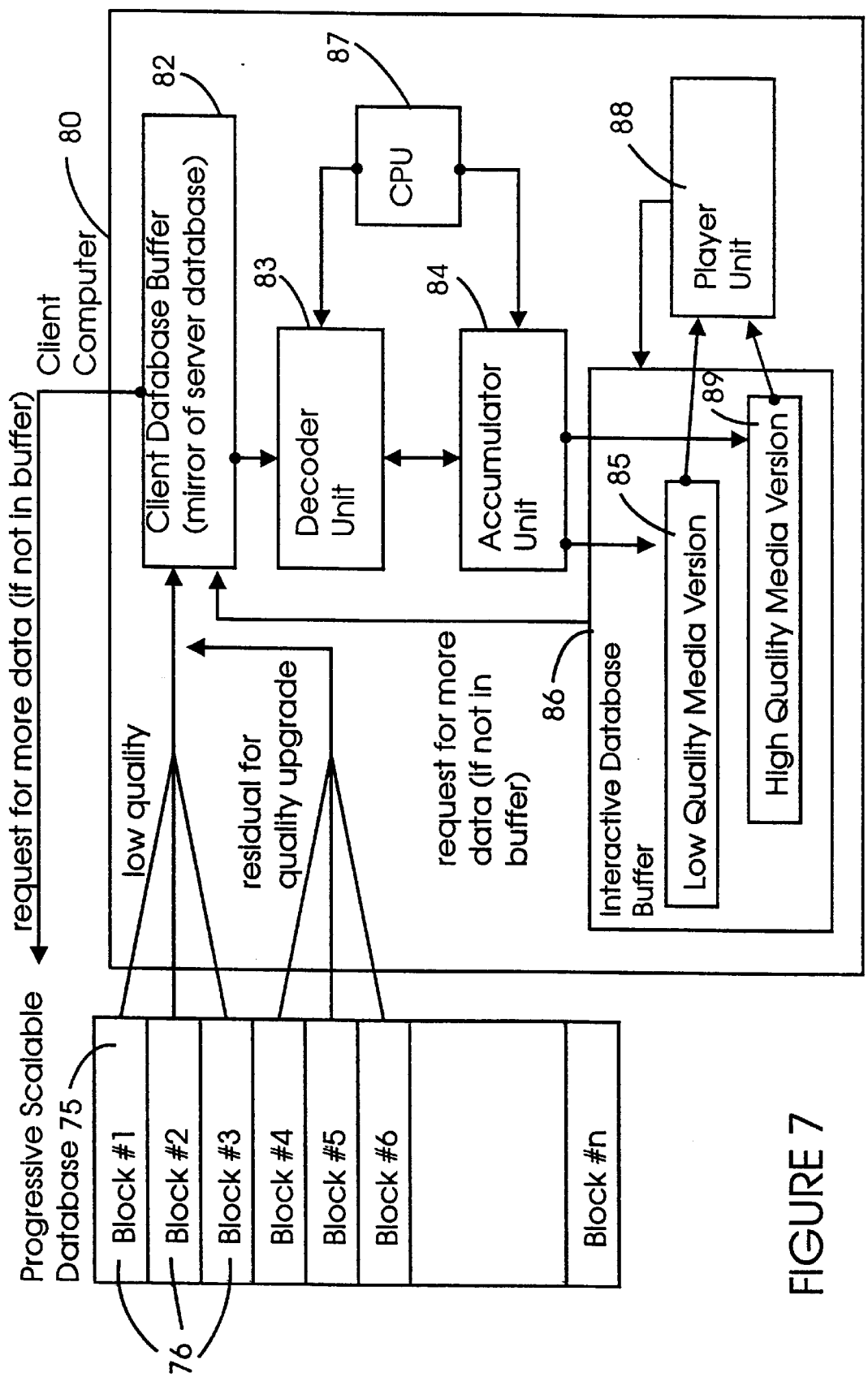
FIG. 7 is a simplified schematic diagram of a decoder for receiving and integrating data blocks from a scalable database, to form a version of a digital multimedia object for playback in accordance with a preferred embodiment of the present invention.

Reference is now made to FIG. 7 showing the decoder on a client computer 80. The client computer 80 receives from server 77 (FIG. 5) into a buffer 82 a series of data blocks 76 from scalable database 75. As the blocks are received, a client database, which mirrors the server database, is built up. A decoder unit 83 decompresses the blocks and an accumulator unit 84 integrates them to form a suitable low quality version 85 of the multimedia file 73 (FIG. 5), which is stored in a buffer 86, thus building up an interactive database.

The operations of the decoder 83 and accumulator 84 are governed by a CPU 87. They may operate in either order; i.e., the decoding may be carried out before the accumulation, or the accumulation may be carried out before the decoding. The multimedia file 73 is played on a player unit 88 in response to interactive user commands. As the user interactively requests specific frames to be played, the buffer 86 supplies the highest quality version which it possesses. If the desired frame is not available, the buffer 86 sends back a request to buffer 82 to decode and accumulate that frame. If the frame is also not available in buffer 82, then that buffer 82 sends back a request to the server database 75 to transmit the frame. As playback continues and the bandwidth frees, additional data blocks 76 are received and integrated with the previously received blocks into higher quality versions 89 of the multimedia file.

The description of FIGS. 1–7 has been directed towards the overall system and method provided by the present invention. The description which follows is directly principally to particular applications of the system and method described hereinabove.

Figure 8:
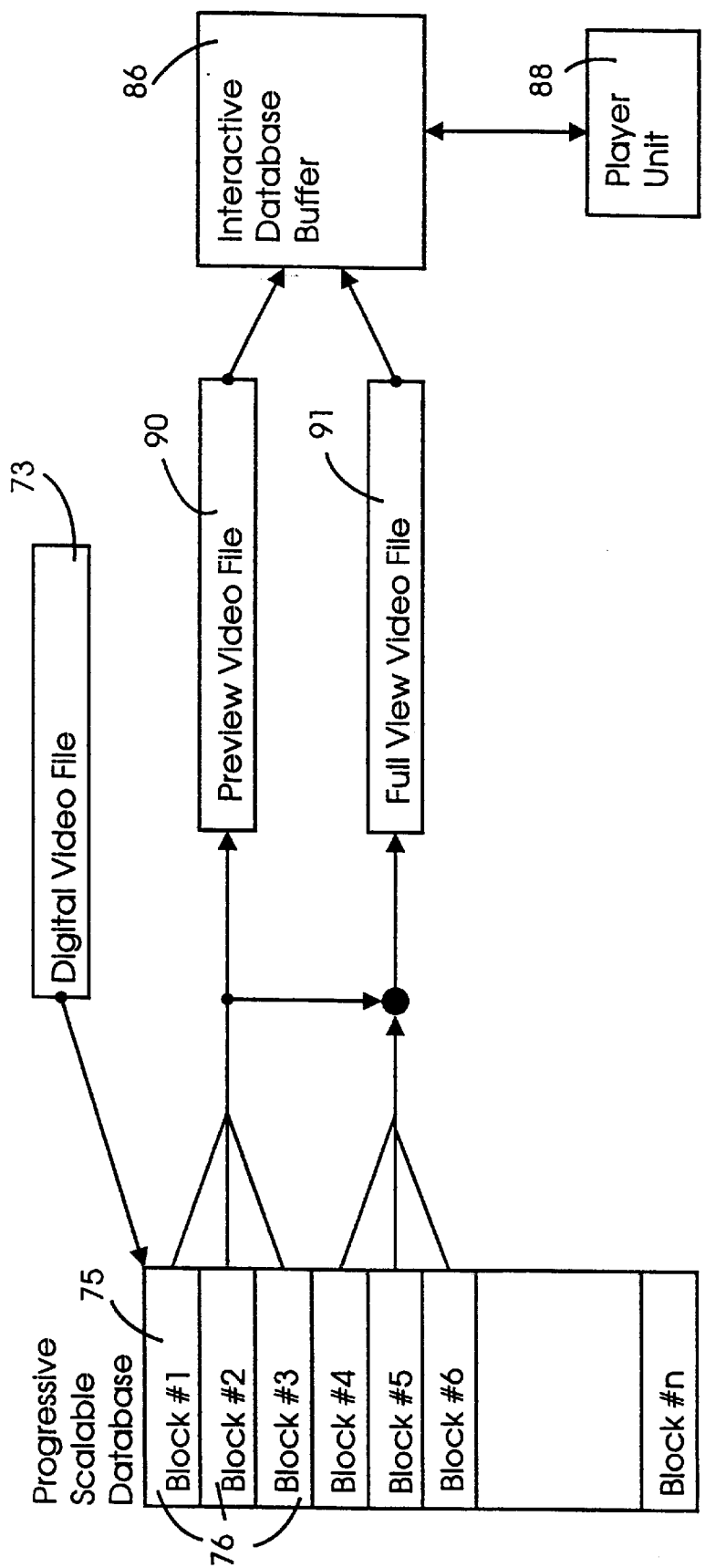
FIG. 8 is a simplified schematic diagram of a scalable progressive database for a video clip in which the first data blocks are used for previewing the video in accordance with a preferred embodiment of the present invention.

Reference is now made to FIG. 8 showing a progressive database 75 for a digital video file which corresponds to digital multimedia file 73 (FIG. 5). The progressive database 75 comprises data blocks, where the first ones of data blocks 76 are used to create a preview 90 of the video, and the second ones of data blocks 76 are accumulated with the first blocks to create a full view 91 of the video. The views are stored in the interactive database buffer 86 and played in player unit 88, in response to interactive user commands.

Figure 9:
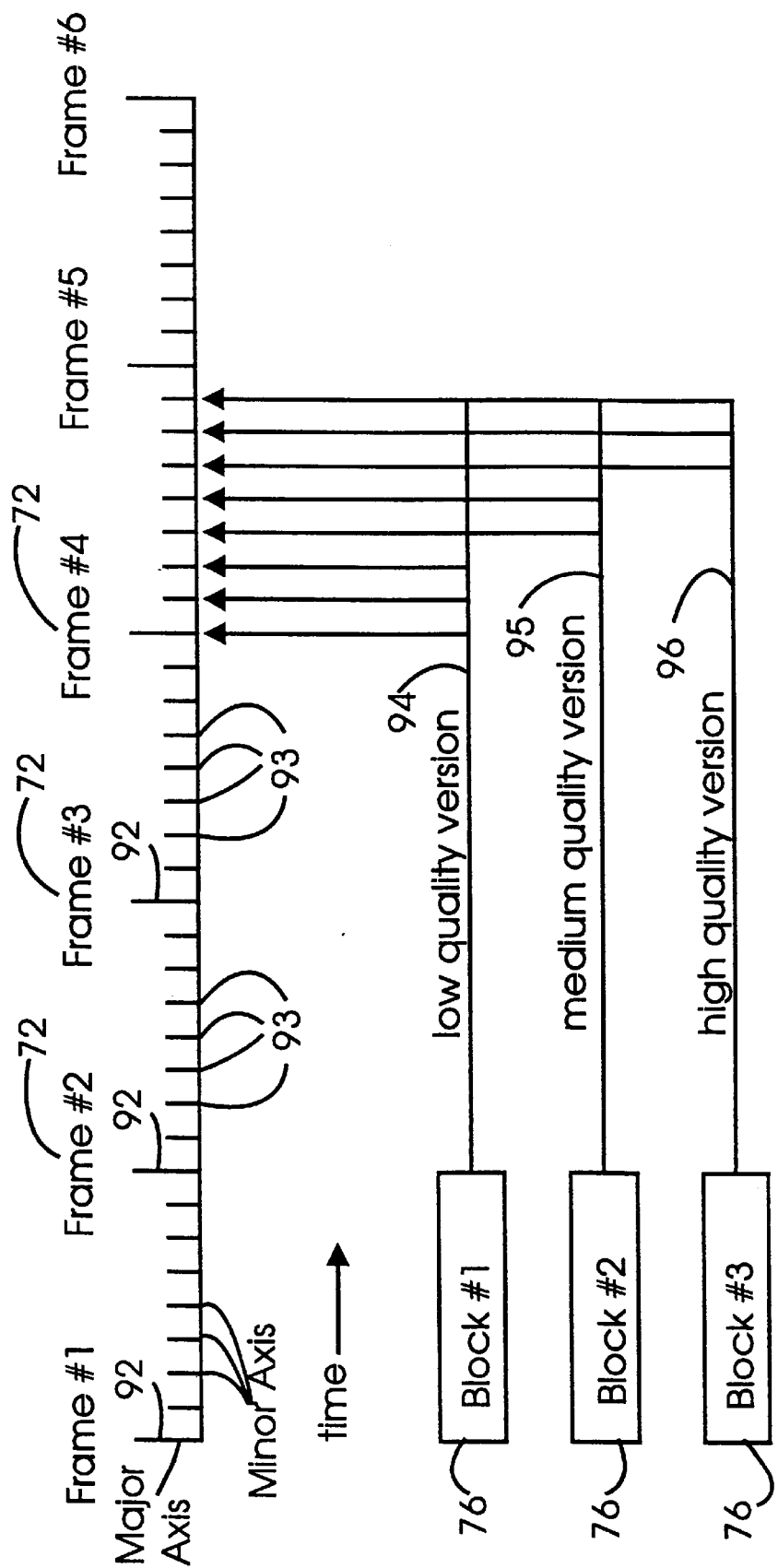
FIG. 9 and FIG. 10 are simplified schematic diagrams of a system for incorporating a scalable progressive database into a time-based video sequence of frames indexed by two time scales: a macro and micro scale, in accordance with a preferred embodiment of the present invention.

Reference is now made to FIG. 9 showing a system for incorporating a progressive scalable database into a time-based video frame sequence with a macro and micro time scale, such as the one used in Apple's QUICKTIME® movies in accordance with a preferred embodiment of the present invention. Individual frames 72 are arranged according to a macro time scale, denoted by major axis markings 92 in FIG. 9. Each frame is displayed at the respective macro times indicated by markings 92.

Between successive frames 72, small fluctuations can be introduced. For example, the major time scale can be displaying a bird flying, and the minor time scale can be used to add fluttering to the bird's wings. The fluctuations typically involve only a small portion of the image area, and are displayed in rapid succession, according to minor axis markings 93 in FIG. 9. Such a time based sequence allows the decoder, which does the intensive processing to supply the frames 72, to run at a slow rate; e.g. 3 fps, whereas the viewer, doing the less intensive processing, can be playing at a fast rate; e.g. 30 fps. The fluctuations must be simple enough, though, that they can be rendered at the full 30 fps rate.

The present invention includes a novel use of such a two-scale time based system, to enable progressive streaming. In order to utilize the progressive database of the present invention in viewing such time-based video sequences, the minor time scale 93 is used to display progressive versions of a frame, rather than to display fluctuations, as originally conceived in the prior art. At each time corresponding to a minor axis marking, the player displays the latest version of the frame which is available. For example, in FIG. 9 the low quality version 94 of frame #4, corresponding to the first block 76, is displayed over a duration of three minor axis marks, by which time the second block 76 has been accumulated to form the medium quality version 95. This medium quality version is then displayed over a duration of two minor axis marks, by which time the third block 76 has been accumulated to form the high quality version 96 of the media. This high quality version is then displayed for a duration of three further minor axis marks, following which the frame advances to frame #5.

The cycle then repeats for progressive display of frame #5. If additional blocks arrive and are accumulated for frame #4, they are displayed when the video sequence is replayed. Thus it is seen that the progressive dimension of the database can be incorporated within the interactive dimension, through the use of a minor time scale, which is situated within the major time scale used for advancing the frames. The major time scale is the interactive axis, and the minor time scale becomes the progressive axis. The overall accomplishment is to enable viewing of the video before the full media stream has been downloaded. Initially, the low quality frames are displayed, and while additional blocks are downloaded and accumulated in background, the quality of the frames steadily improves.

In accordance with a preferred embodiment of the present invention, for the user to be able to view the video immediately, without waiting for the entire file to download, a production tool must store the encoded video in the order of successive blocks. Once the first block is downloaded, the video can already be viewed. The order of the encoded data items must therefore be:

Frame 1/Block 1, Frame 2/Block 1, . . . , Frame m/Block 1, . . . ,

Frame 1/Block n, Frame 2/Block n, . . . , Frame m/Block n

Each row in this order comprises one entire block. In order to integrate this file format within the two-scale time-based system, each partial frame must be handled as if it were an entire frame. That is, the production tool must treat the movie as if there were a total of m·n distinct frames being encoded. The player in turn, however, must know that although it is receiving what appears to be m·n encoded frames, there are really only a total of m frames. It must decode and accumulate every successive sequence of m data items (i.e., each row of the above sequence) with the previous ones, to update the frames.

On the other hand, the natural order in which the production tool produces the encoded data items is:

Frame 1/Block 1, Frame 1/Block 2, . . . , Frame 1/Block n, . . . ,

Frame m/Block 1, Frame m/Block 2, . . . , Frame m/Block n

This is because each frame is sent only once to the codec for encoding, and returned as a series of encoded partial frames. Thus it is necessary to post-process the encoded data file, to rearrange the data items from this latter frame dominated order to the former block dominated order. This rearrangement process is referred to as "flattening" in the art, and is illustrated in FIG. 10.

Figure 10:
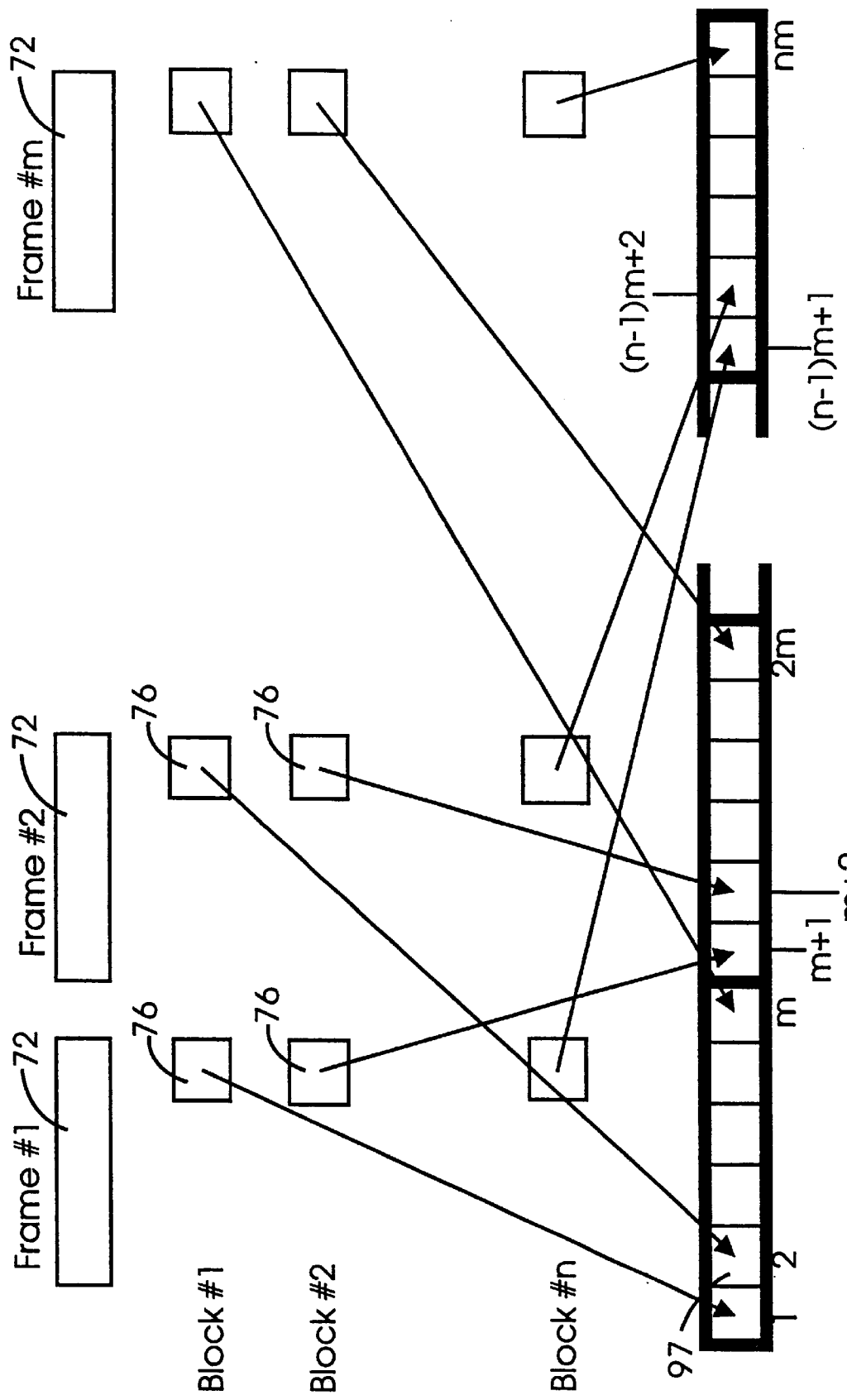

As seen in FIG. 10, the frames 72 are supplied in sequence to the production tool, which produces a series of partial blocks 76 for each frame. The partial blocks are reordered, as indicated by the mapping in FIG. 10, into a single file stream 97. As indicated, the first partial blocks of each frame form the first m data units in the file 97, the second set of partial blocks of each frame form the next m data units, etc.

Figure 11:
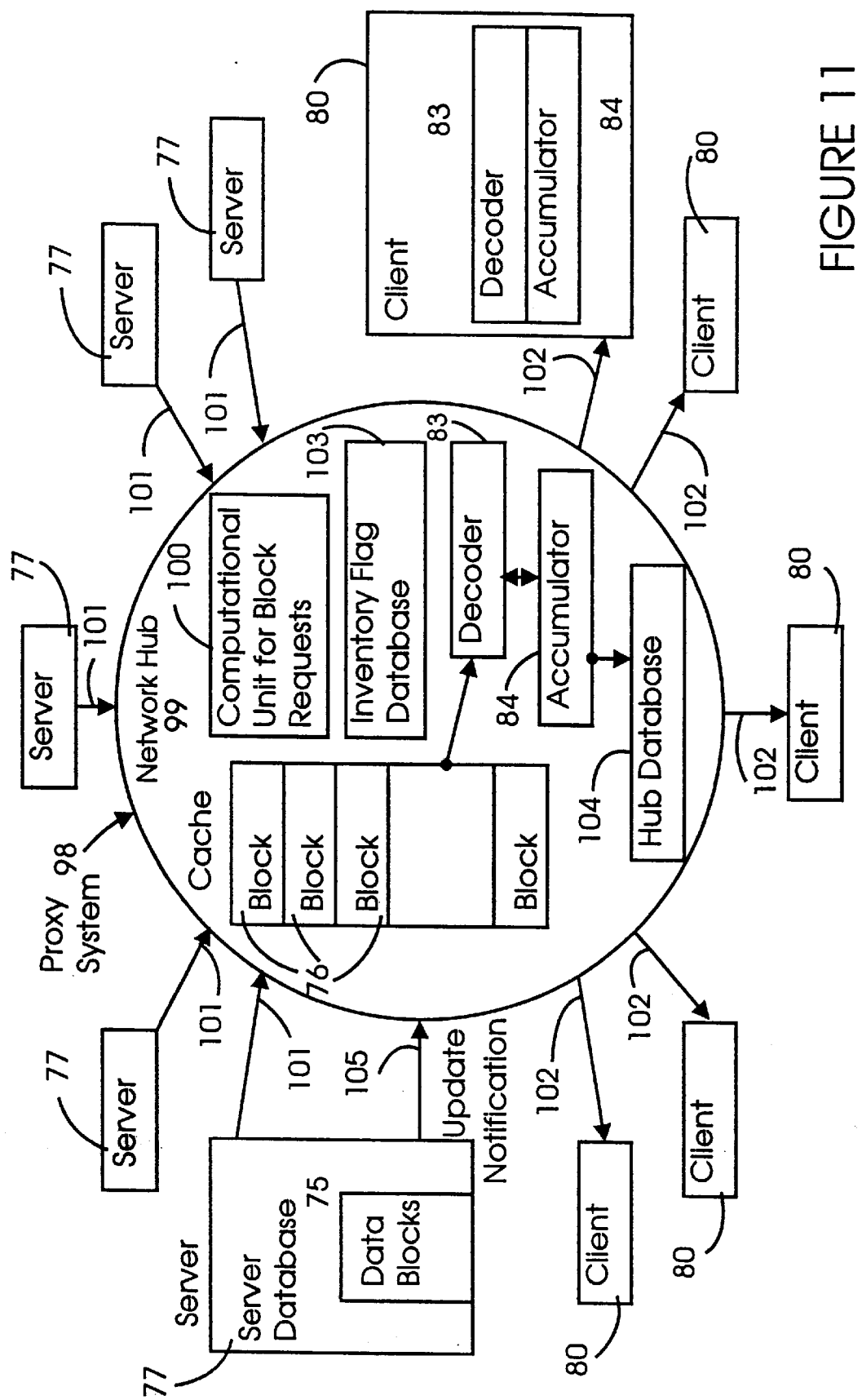
FIG. 11 is a simplified block diagram of a proxy system used to cache in a central hub multimedia data which is transmitted from servers to clients in accordance with a preferred embodiment of the present invention.

Reference is now made to FIG. 11 which shows a proxy system 98 for caching in a central hub 99 multimedia data which streams from servers 77 to clients 80. The servers 77 store their multimedia data in the progressive scalable representation described above in the server database 75, with each media encoded into data blocks 76 $B_1$, $B_2$, ..., $B_n$. Multiple servers 77 are connected through the central hub 99 to clients 80 via data communication channels. These channels are of various bandwidths. Whenever a client 80 issues a request for data from a specific server, a proxy computational unit 100 first determines, based on the server bandwidth, which data blocks are to be transmitted to the client. If those data blocks are not already cached in the hub, then the proxy 98 retrieves the required blocks 76 from the server along low bandwidth communication channels 101, at the appropriate bandwidth, and delivers them to the client 80 along high bandwidth communication channels 102. The blocks 76 are also cached in the hub 99.

There is provided an inventory flag database 103 on the hub which keeps a record of which data blocks are available. If some of the required data blocks 76 are already cached, then the proxy computational unit 100 computes which data blocks must be delivered from the server 77 in order to transmit to the client the highest quality version of the media possible, within the bandwidth constraint. The proxy 98 then retrieves the required blocks 76 from the server 77 along low bandwidth communication channels 101, stores them in its cache and delivers them to the client 80 along high bandwidth communication channels 102. A decoder unit 83 on the client computer decodes the data blocks received, and an accumulator unit 84 integrates them. The proxy 98 may also have its own decoder unit 83 and accumulator unit 84, which converts the data from its original compressed form on the server database 77 to an intermediate compressed form on the hub database 104, one which is faster to decompress than that of the client database. The proxy accumulation unit 84 may perform the necessary data block accumulation to store on the hub all possible versions of the multimedia in its intermediate compressed form, in which case the client accumulator 84 unit is unnecessary.

An update communication line 105 links servers 77 to the proxy 98, through which servers 77 can notify proxy 98 if any of the multimedia files have been updated. If proxy 98 receives such notification, then it clears its cache of any data blocks associated with those updated files, and resets its inventory flags 103, so that upon future client requests it will know that it has to retrieve the updated files from the server again.

There are several ways to generate the data blocks $B_1$, $B_2$, ..., $B_n$ for the progressive scalable database, so as to satisfy the user-selected constraints that (i) for each $1 \leq k \leq n$, the first consecutive compressed data blocks $B_1$, $B_2$, ..., $B_k$ when integrated together produce a version of the media at a quality level commensurate with bandwidth $f_k$;

(ii) the sizes of the compressed data blocks are such that the first consecutive compressed data blocks $B_1$, $B_2$, . . . , $B_k$ when transmitted at bandwidth $f_k$ suffice to enable on-line playback of the media version.

Figure 12:
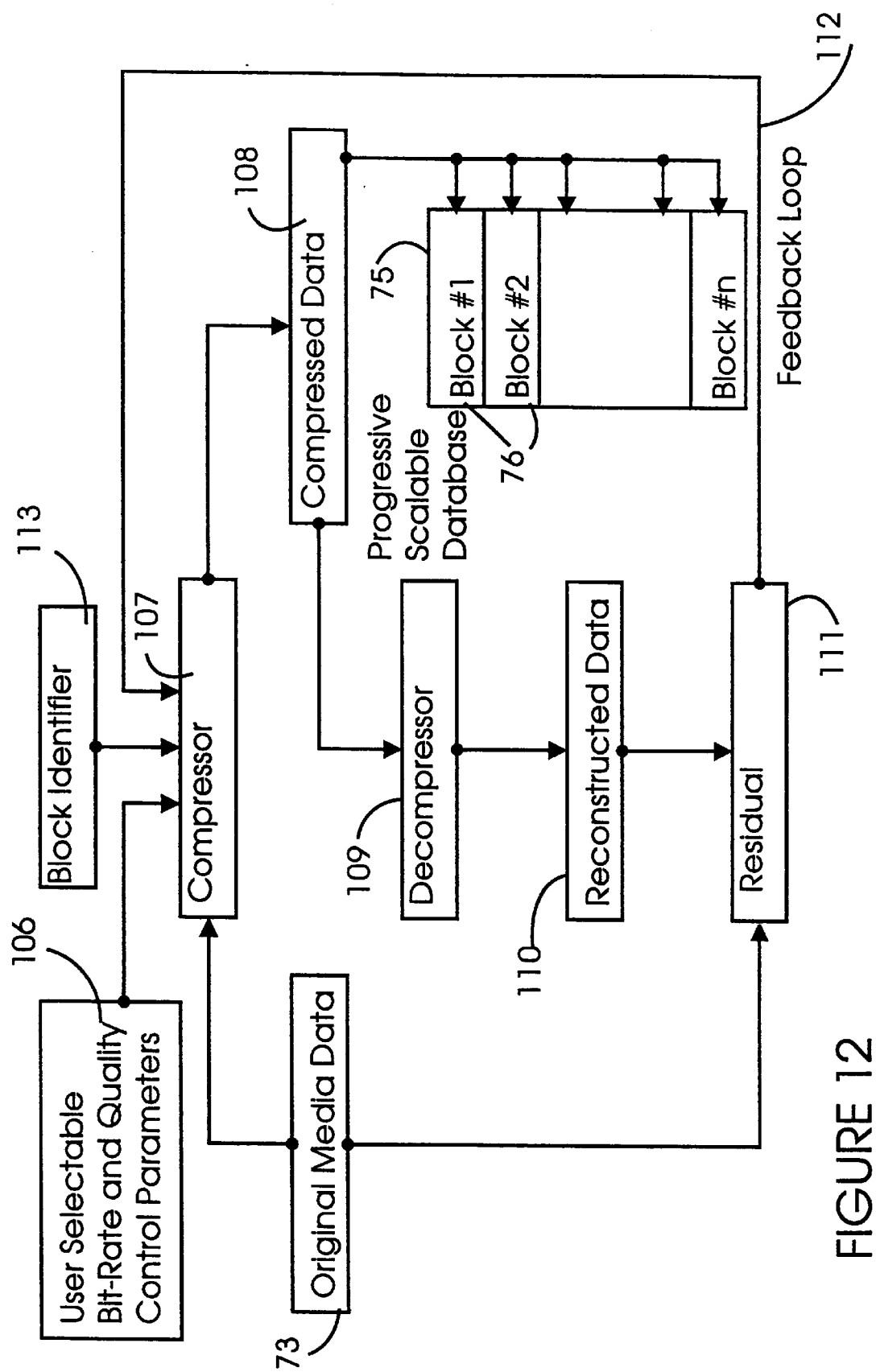
FIG. 12 is a simplified block diagram of a system for generating a scalable database from digital media data, by running a compressor in a feedback loop in accordance with a preferred embodiment of the present invention.

Reference is now made to FIG. 12 which shows a system for generating a progressive scalable database from digital media data by cascading compressors in tandem. The user selects bit-rate and quality control parameters 106 for the encoding. The original multimedia data file 73 is input to a compressor 107 along with the user-selected control parameters 106, resulting in compressed data 108 adapted to a user-selected bandwidth. The compressed data 108 is transmitted to the scalable database 75 as the first data block 76. It is also transmitted to decompressor 109, which reconstructs the media as it would be generated on the client side.

The reconstructed data 110 is subtracted from the original data 73 to arrive at a residual 111. The residual 111 is fed back to the compressor 107 in a feedback loop 112, and compressed by compressor 107 with bit-rate control so that the compressed data 108 is adapted to the difference between the first and second user-selected bandwidths. The compressed data is transmitted to the progressive scalable database 75 as the second data block 76, and the loop continues repeatedly until the user-selected final quality is achieved.

It is not necessary for the compressor 107 to use the same compression method each time it operates. Rather, it can use a block identifier 113 as a parameter for switching between methods. For example, with a video encoder, the first block could be encoded using a low quality version of H.263 and successive blocks could be encoded using spatial vector quantization and temporal wavelets.

One possible approach to compression is the use of fractal technology, such as that described and claimed in applicant's U.S. Pat. No. 5,497,435, the disclosure of which is hereby incorporated by reference.

Another approach to generating a scalable database is through the use of progressive JPEG. The progressive JPEG standard allows the encoder to segment the compression into spectral selection and successive approximation scans. In spectral selection the DCT coefficients are grouped into spectral bands, and in successive approximation the bits used to represent them are divided into lower and higher precision information. Progressive JPEG is described by Pennebaker, W. B. and Mitchell, J. L. in JPEG: *Still Image Data Compression*, Van-Nostrand Reinhold, New York, 1993, the disclosure of which is hereby incorporated by reference.

Figure 13:
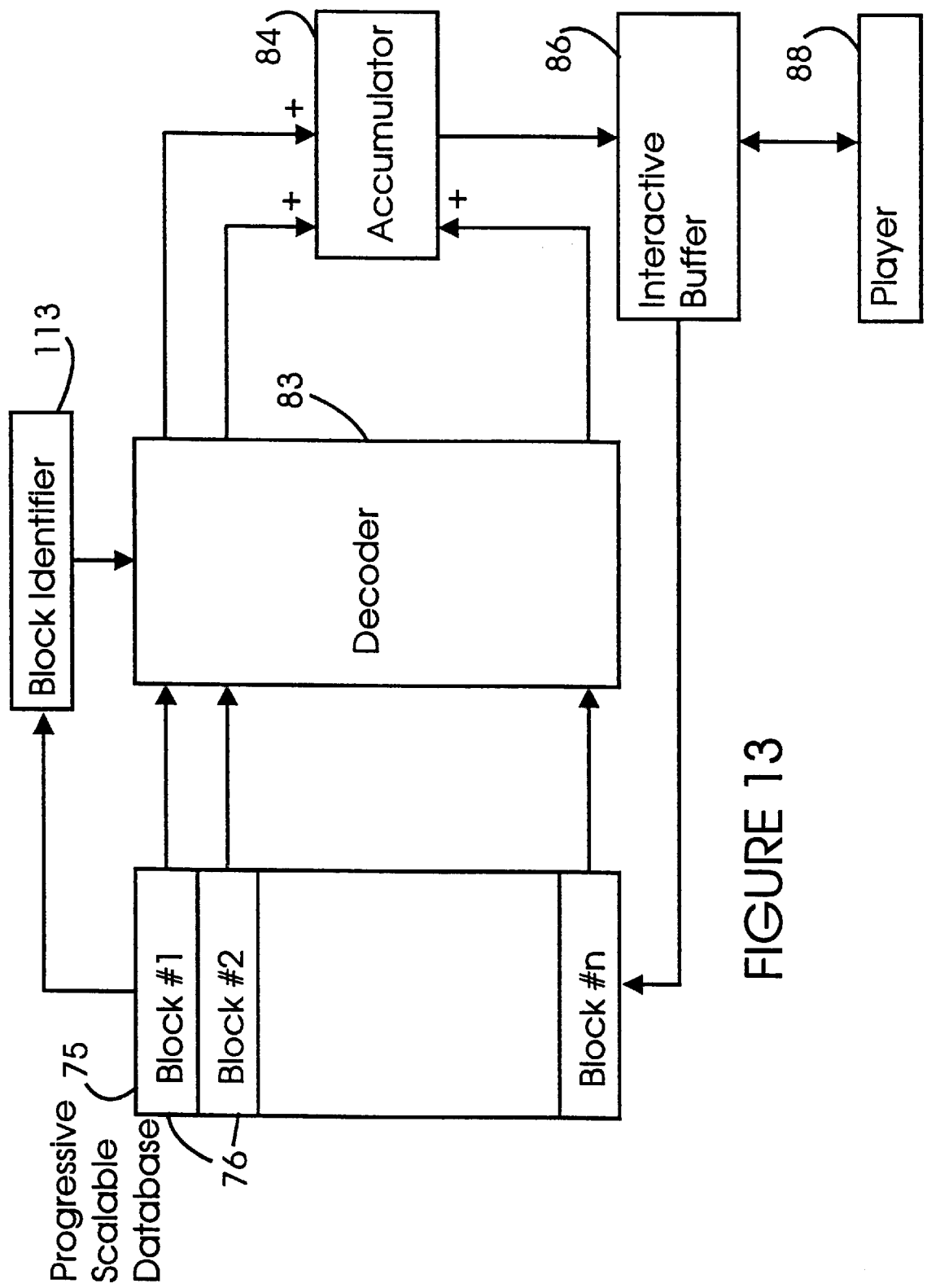
FIG. 13 is a simplified block diagram of a decoder for the database generated by the system of FIG. 12 in accordance with a preferred embodiment of the present invention.

Reference is now made to FIG. 13 which shows a decoder for the scalable database 75 on the client side, corresponding to the encoder from FIG. 12. Blocks 76 are successively transmitted from the server to the client and are decompressed in decoder 83. The decoded data is integrated in an accumulator 84, which converts it into a form compatible with the player 88, and stores it in the interactive buffer 86. While the player is showing the media, additional blocks 76 are received in the background, decoded and accumulated, so that the media quality is upgraded when it is replayed. The player 88 requests frames from buffer 86, and if they are not available then buffer 86 requests them from database 75. A block identifier 113 provides an input to the decoder as each block is decoded, so that th e decoder can apply the appropriate decompression method for that data block, corresponding to the compression method which was performed in compressor 107.

Figure 14:
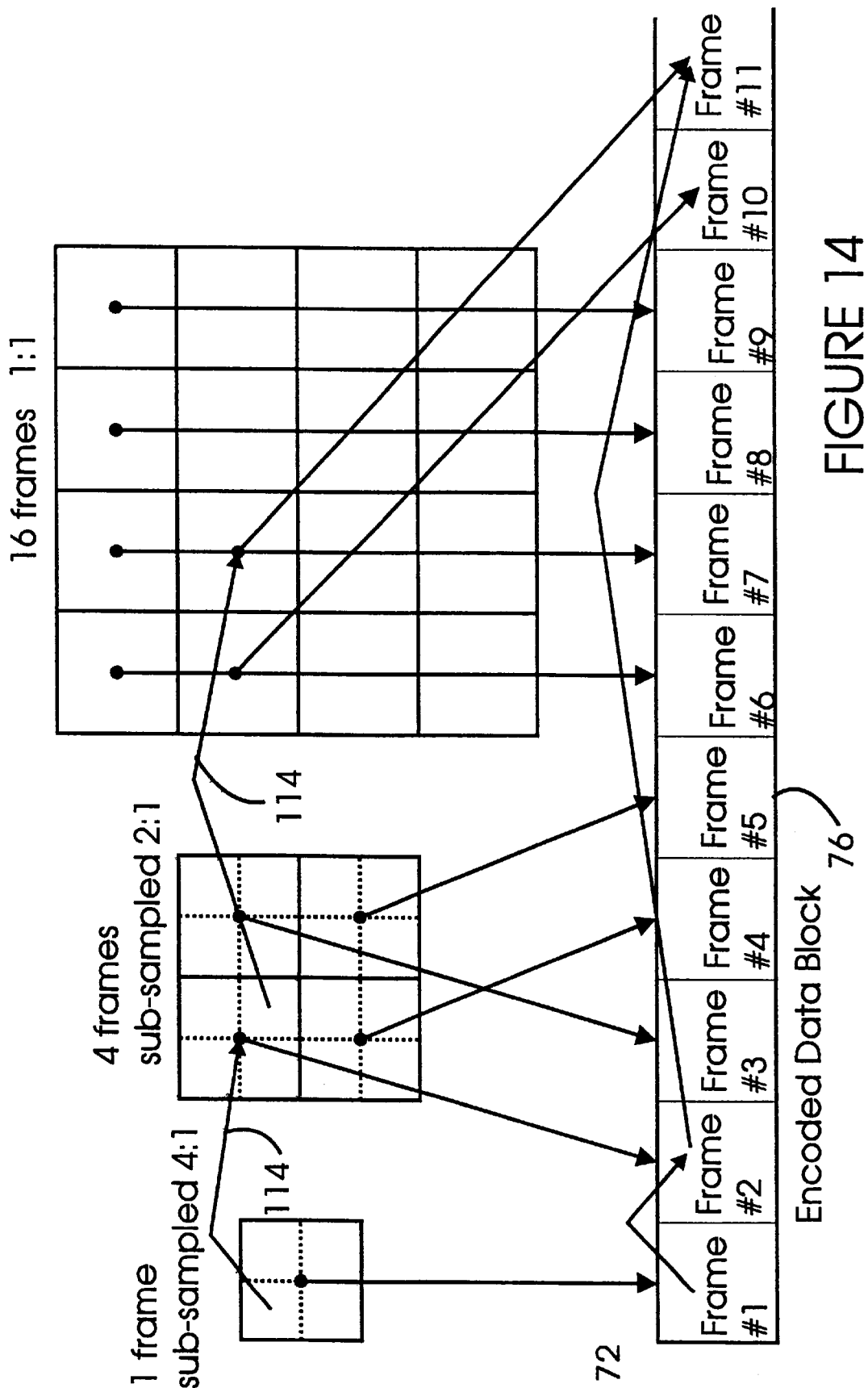
FIG. 14 is a simplified diagram illustrating a scalable progressive database useful for a large still image in accordance with a preferred embodiment of the present invention.

Reference is now made to FIG. 14 which shows a progressive database for a large still image. The first encoded frame unit of a data block consists of the full image sub-sampled 4:1 in each dimension. The second set of frames consist of four encoded frame units corresponding to each of the quadrants of the full image, sub-sampled at 2:1. Although this second set of frames appears to be four times the size of the first frame, it can be stored using only three times as much data since the decoder can also accumulate data from the previously displayed frame. The third set of frames includes sixteen encoded frame units, each corresponding to a quadrant of a quadrant of the full image, but at the original scale. Again, this third set of frames stores three times as much data as the second set. These three sets of frames comprise the entire encoded data block, and their sum total is, of course, the same amount of data as the full image at the original scale. (The effect of the compression is being ignored here.) The frames are all arranged sequentially in the encoded data block 76. The mapping from multi-resolution image tiles to sequential frames 72 is shown in FIG. 14.

When the frame #1 is downloaded, decoded and displayed, the viewer sees a low resolution version of the full image. In the example shown in FIG. 14, the viewer clicks on a hot spot in the northwest quadrant and link 114 then transfers over to the northwest frame in the second set of frames, which corresponds to frame #2 in FIG. 14. Displaying this new frame gives the appearance of having zoomed in on the quadrant. The viewer next clicks on a hot spot in the southeast quadrant of the frame being displayed from the second set, and link 114 then transfers over to the indicated frame in the third set of frames, which corresponds to frame #11 in the FIG. 14, giving the effect of yet another zoom in.

While the viewer is looking at the first frame, the data from the second set of frames is being downloaded in the background. Once received, this data is decoded and stored in the client interactive database. When the hot spot in the northwest quadrant is clicked, the client CPU looks for the desired frame #2 in its interactive database. If the frame is already present, it is delivered to the viewer for immediate display; otherwise the interactive buffer sends the request back to the progressive database. The progressive database can access and send the specific encoded frame required from the second set of frames, without sending all of the frames. Finally, as successive blocks are integrated into the interactive database, the quality of the individual frames is enhanced, and the zoomed in tile looks progressively better and better, having cumulatively enhanced quality.

It is evident to those skilled in the art that the above discussion applies to animations and panoramas of large images which contain areas of interest such as sprites. The frames comprising the interactivity dimension of the database would correspond to multi-resolution tiles from each of the individual images in the animation or panorama.

Figure 15:
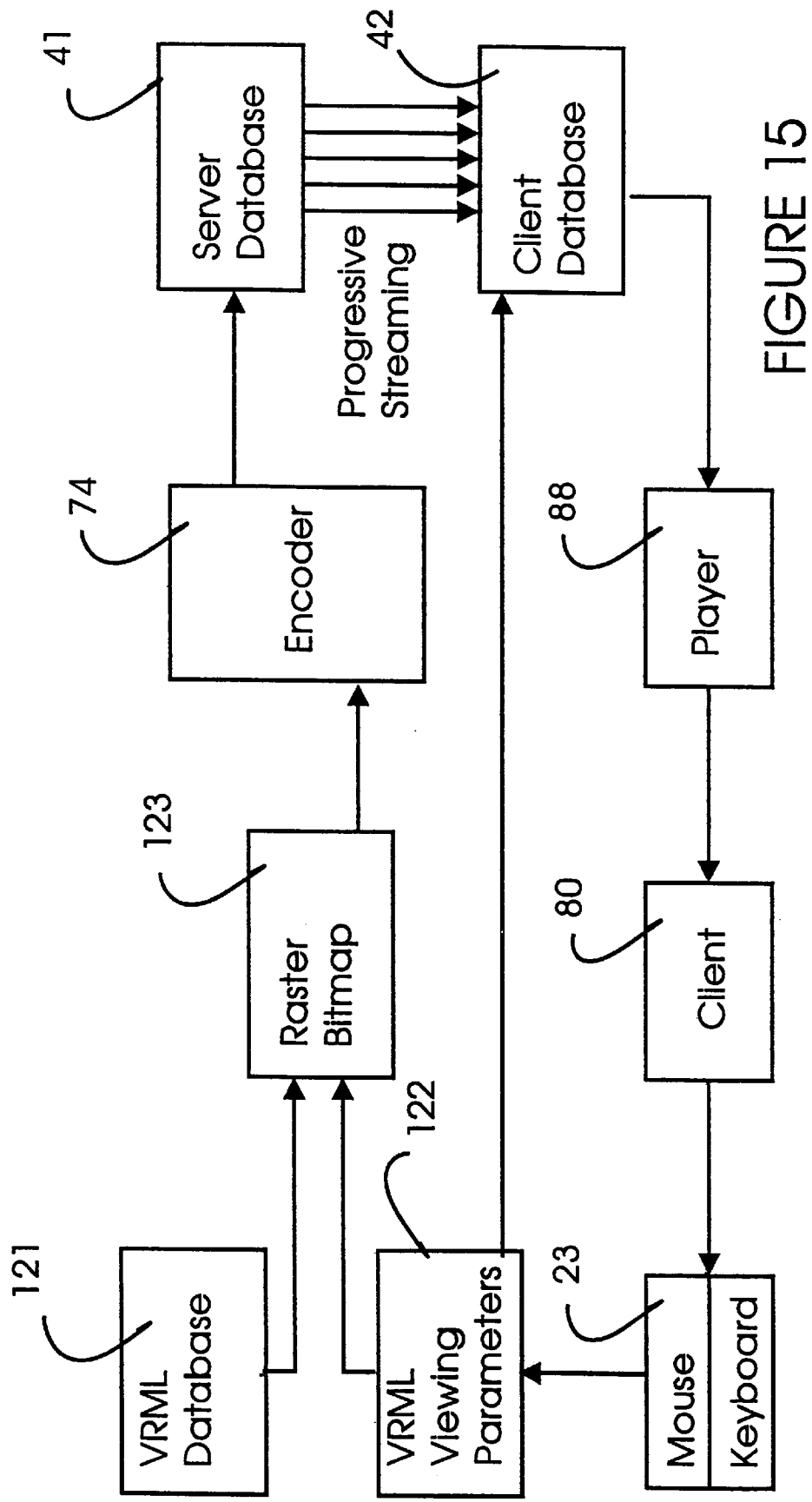
FIG. 15 is a simplified diagram illustrating a virtual reality system constructed and operative in accordance with a preferred embodiment of the present invention.

FIG. 15 illustrates a system for transmitting VRML images over a server/client network. A VRML database 121 is stored on a server. A client 80 interactively controls the VRML viewing parameters 122 through use of a mouse and keyboard 23. The viewing parameters 122 are used in conjunction with the VRML database 121 to render a raster bitmap image 123 of the VRML object on the server computer. If the bitmap image corresponding to the viewing parameters was already rendered previously, then the frame data for the bitmap in the client database 42 is used for display by the player 88. The raster bitmap is encoded into partial frames by encoder 74, and the partial frames are inserted into a server two-dimensional database 41. The server database is continually streamed to the client, building up the client database 42. The client database 42 is used to provide the frames for display.

Figure 16:
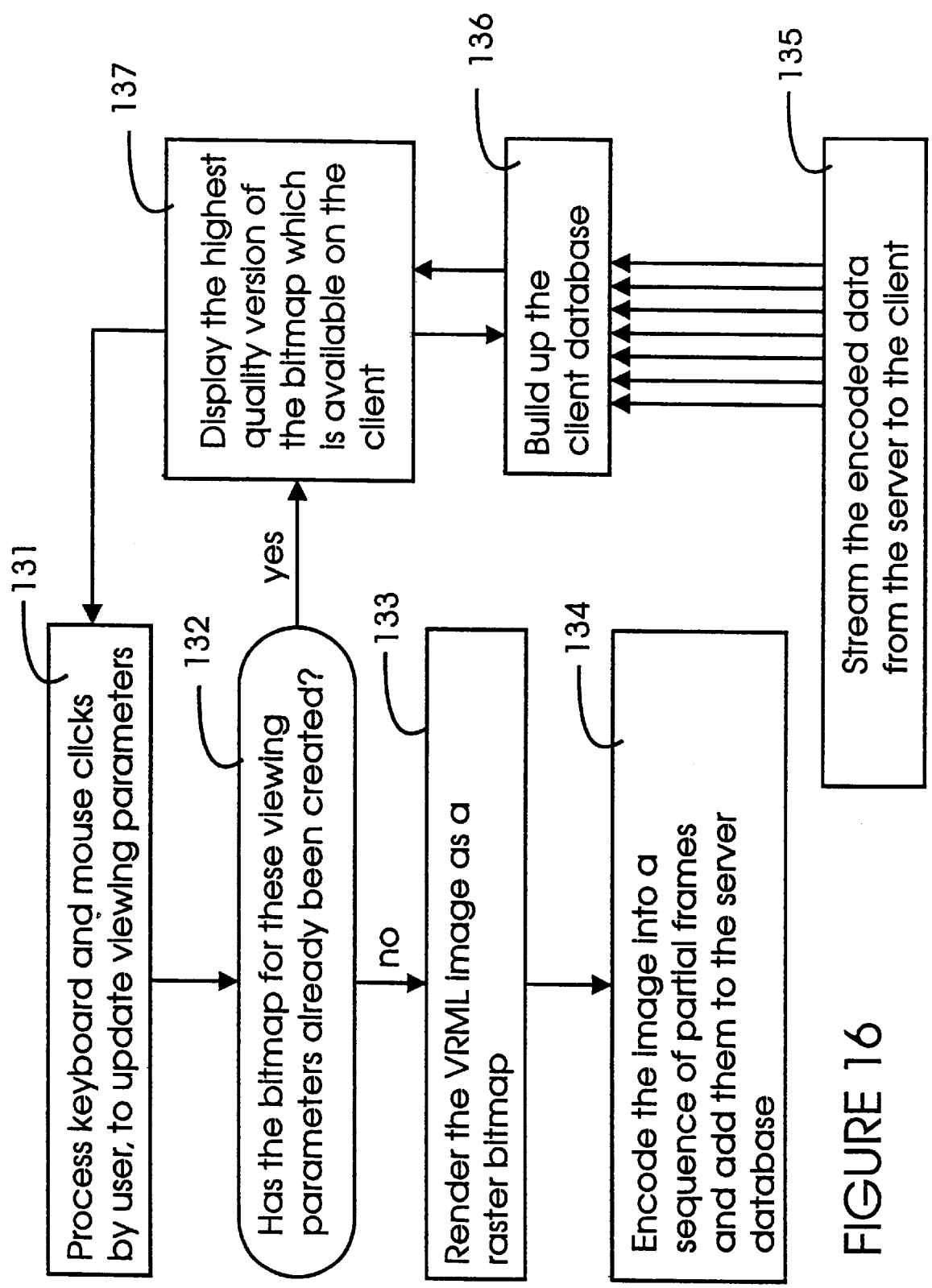
FIG. 16 is a simplified flowchart illustrating operation of the system of FIG. 15.

FIG. 16 depicts a flowchart for the VRML application shown in FIG. 15. At step 131, the user interacts with the mouse and keyboard, and the client computer updates the viewing parameters. At step 132 the client computer checks whether or not those viewing parameters have already been processed. Although the viewing parameters can vary continuously, a preferred embodiment of the present invention discretizes them to a finite number of settings; for example, 10° resolution for angles. This makes it likely that the user will navigate back to the same settings used earlier.

If the viewing parameters are new, then they are sent to the server computer, which renders the VRML database into a raster bitmap corresponding to the specific viewing parameters selected, at step 133. At step 134 the bitmap is encoded into partial frames, and incorporated into the server database. Step 135 is continually operative to transmit additional encoded data from the server to the client. As data is received on the client, the client database is built up at step 136. At step 137 the client database generates the latest version of the bitmap on demand, and displays it. This step is also carried out whenever step 132 results in confirmation that the viewing parameters have already been processed.

Figure 17:
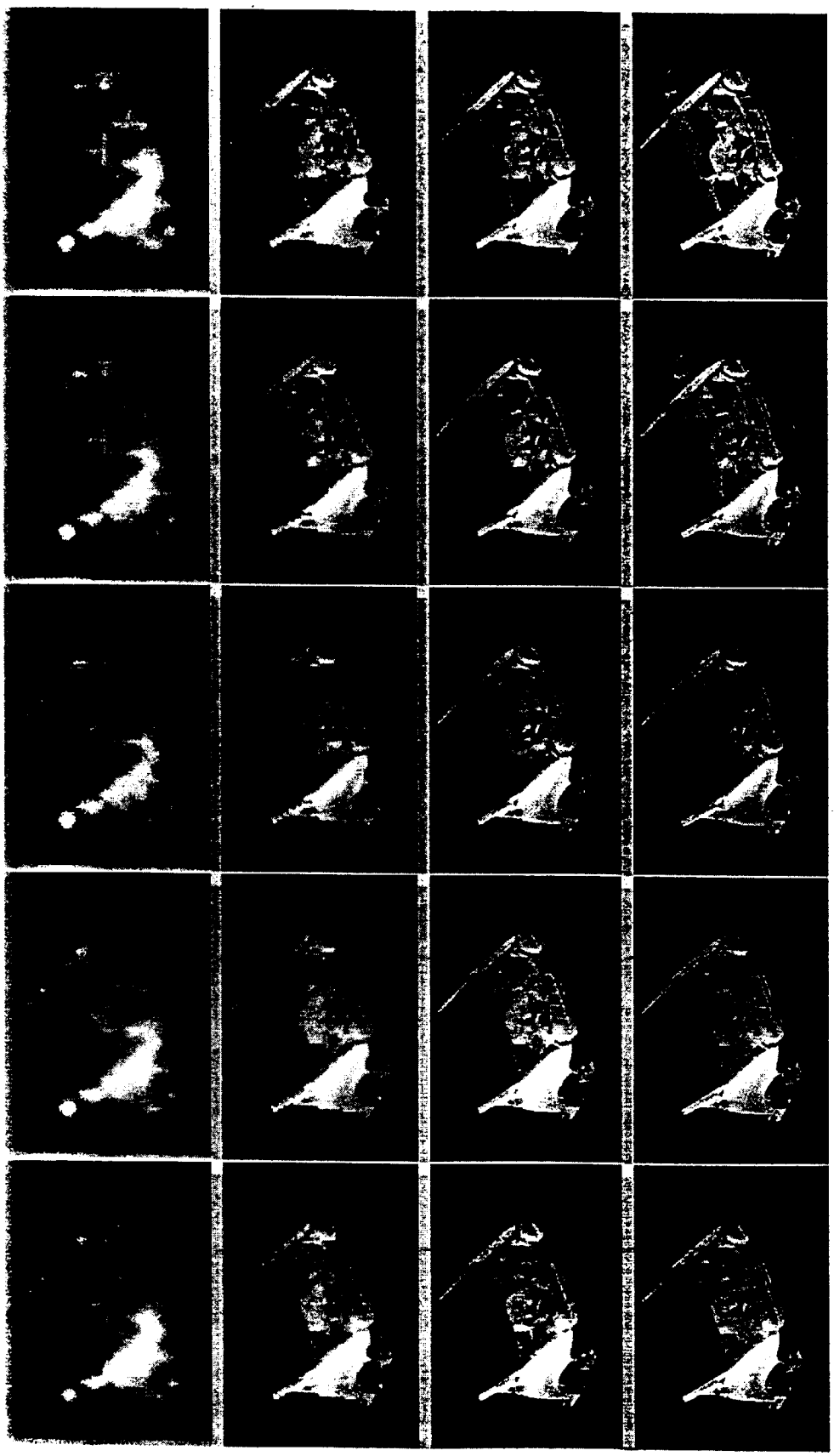
FIG. 17 is an illustration of the operation of a preferred embodiment of the present invention illustrated in FIGS. 15 and 16, permission to reproduce FIG. 17 was granted by Tecnomatix, Ltd.

It is evident to those skilled in the art that the above discussion applies to CAD/CAM models for three-dimensional objects, as well as VRML models. Specifically, FIG. 17 illustrates a typical two-dimensional array of CAD/CAM images, indexed vertically according to progressive coordinate and horizontally according to interactive coordinate. It is appreciated that the images in a given horizontal row may be viewed interactively. Each successive horizontal row of images is built up over time at a rate determined by bandwidth availability and has increased quality inasmuch as it is based on an increasing number of data blocks.

It will be appreciated by persons skilled in the art that the present invention is not limited by what has been particularly shown and described hereinabove but extends also to embodiments which would naturally occur to persons reading the above description and to combinations and subcombinations of embodiments described hereinabove.

What is claimed is:

1. A method for encoding video to be stored on a server computer for delivery to client computers, comprising:

encoding the video into a series of encoded data blocks, each block comprising a sequence of encoded frames, with the property that successive blocks when decoded and integrated together provide successively higher bandwidth versions of the video for playback;

storing the encoded data blocks on a server computer;

processing a request by a client computer for delivery of the video, to determine which data blocks to transmit so as to accommodate the client computer bandwidth;

transmitting necessary data blocks to the client computer;

decoding the data blocks on the client computer;

integrating the data blocks together on the client computer to reconstruct an appropriate version of the video; and playing the reconstructed version of the video on the client computer, wherein said transmitting, decoding, integrating and playing are repeated in succession a number of times in order to transmit additional data blocks to the client, thereby upgrading the quality of the video while it is replayed.

2. A method for encoding audio to be stored on a server computer for delivery to client computers, comprising:

encoding the audio into a series of encoded data blocks, each block comprising a sequence of encoded frames, with the property that successive blocks when decoded and integrated together provide successively higher bandwidth versions of the audio for playback;

storing the encoded data blocks on a server computer;

processing a request by a client computer for delivery of the audio, to determine which data blocks to transmit so as to accommodate the client computer bandwidth;

transmitting necessary data blocks to the client computer;

decoding the data blocks on the client computer;

integrating the data blocks together on the client computer to reconstruct an appropriate version of the audio; and playing the reconstructed version of the audio on the client computer, wherein said transmitting, decoding, integrating and playing are repeated in succession a number of times in order to transmit additional data blocks to the client, thereby upgrading the quality of the audio while it is replayed.

3. A method for encoding an object movie to be stored on a server computer for delivery to client computers, comprising:

encoding the object movie into a series of encoded data blocks, each block comprising a sequence of encoded frames, with the property that successive blocks when decoded and integrated together provide successively higher bandwidth versions of the object movie for playback;

storing the encoded data blocks on a server computer;

processing a request by a client computer for delivery of the object movie, to determine which data blocks to transmit so as to accommodate the client computer bandwidth;

transmitting necessary data blocks to the client computer;

decoding the data blocks on the client computer;

integrating the data blocks together on the client computer to reconstruct an appropriate version of the object movie; and playing the reconstructed version of the object movie on the client computer, wherein said transmitting, decoding, integrating and playing are repeated in succession a number of times in order to transmit additional data blocks to the client, thereby upgrading the quality of the object movie while it is replayed.

4. A method for encoding a panorama to be stored on a server computer for delivery to client computers, comprising:

encoding the panorama into a series of encoded data blocks, each block comprising a sequence of encoded frames, with the property that successive blocks when decoded and integrated together provide successively higher bandwidth versions of the panorama for playback;

storing the encoded data blocks on a server computer;

processing a request by a client computer for delivery of the panorama, to determine which data blocks to transmit so as to accommodate the client computer bandwidth;

transmitting necessary data blocks to the client computer;

decoding the data blocks on the client computer;

integrating the data blocks together on the client computer to reconstruct an appropriate version of the panorama; and playing the reconstructed version of the panorama on the client computer, wherein said transmitting, decoding, integrating and playing are repeated in succession a number of times in order to transmit additional data blocks to the client, thereby upgrading the quality of the panorama while it is replayed.

5. A video processing system operative on video for encoding the video, storing it on a server computer and delivering it to client computers upon request comprising:

an encoder for compressing video into a series of encoded data blocks, each block comprising a sequence of encoded frames, with the property that successive blocks when decoded and integrated together provide successively higher bandwidth versions of the video for playback;

a storage device for storing the encoded data blocks on a server computer;

a processing unit for accepting a request by a client computer for delivery of the video, and for determining which data blocks to transmit so as to accommodate the client computer bandwidth;

a transmitter for delivering necessary data blocks to the client computer;

a decoder for decompressing the data blocks on the client computer;

an accumulator for integrating the data blocks together on the client computer to reconstruct an appropriate version of the video; and a player on the client computer for playing the reconstructed version of the video, wherein the transmitter, decoder, accumulator and player repeatedly operate in succession a number of times in order to transmit additional data blocks to the client, thereby upgrading the quality of the video while it is being replayed.

6. An audio processing system operative on audio for encoding the audio, storing it on a server computer and delivering it to client computers upon request comprising:

an encoder for compressing the audio into a series of encoded data blocks, each block comprising a sequence of encoded frames, with the property that successive blocks when decoded and integrated together provide successively higher bandwidth versions of the audio for playback;

a storage device for storing the encoded data blocks on a server computer;

a processing unit for accepting a request by a client computer for delivery of the audio, and for determining which data blocks to transmit so as to accommodate the client computer bandwidth;

a transmitter for delivering necessary data blocks to the client computer;

a decoder for decompressing the data blocks on the client computer;

an accumulator for integrating the data blocks together on the client computer to reconstruct an appropriate version of the audio; and a player on the client computer for playing the reconstructed version of the audio, wherein the transmitter, decoder, accumulator and player repeatedly operate in succession a number of times in order to transmit additional data blocks to the client, thereby upgrading the quality of the audio while it is being replayed.

7. An object movie processing system operative on an object movie for encoding the object movie, storing it on a server computer and delivering it to client computers upon request comprising:

an encoder for compressing the object movie into a series of encoded data blocks, each block comprising a sequence of encoded frames, with the property that successive blocks when decoded and integrated together provide successively higher bandwidth versions of the object movie for playback;

a storage device for storing the encoded data blocks on a server computer;

a processing unit for accepting a request by a client computer for delivery of the object movie, and for determining which data blocks to transmit so as to accommodate the client computer bandwidth;

a transmitter for delivering necessary data blocks to the client computer;

a decoder for decompressing the data blocks on the client computer;

an accumulator for integrating the data blocks together on the client computer to reconstruct an appropriate version of the object movie; and a player on the client computer for playing the reconstructed version of the object movie, wherein the transmitter, decoder, accumulator and player repeatedly operate in succession a number of times in order to transmit additional data blocks to the client, thereby upgrading the quality of the object movie while it is being replayed.

8. A panorama processing system operative on a panorama for encoding the panorama, storing it on a server computer and delivering it to client computers upon request comprising:

an encoder for compressing the panorama into a series of encoded data blocks, each block comprising a sequence of encoded frames, with the property that successive blocks when decoded and integrated together provide successively higher bandwidth versions of the panorama for playback;

a storage device for storing the encoded data blocks on a server computer;

a processing unit for accepting a request by a client computer for delivery of the panorama, and for determining which data blocks to transmit so as to accommodate the client computer bandwidth;

a transmitter for delivering necessary data blocks to the client computer;

a decoder for decompressing the data blocks on the client computer;

an accumulator for integrating the data blocks together on the client computer to reconstruct an appropriate version of the panorama; and a player on the client computer for playing the reconstructed version of the panorama, wherein the transmitter, decoder, accumulator and player repeatedly operate in succession a number of times in order to transmit additional data blocks to the client, thereby upgrading the quality of the panorama while it is being replayed.

9. A method for caching of data which gets transmitted from server computers to client computers on a central hub within a network, comprising:

encoding content into a series of encoded data blocks with the property that successive blocks when decoded and integrated together provide successively higher bandwidth versions of the content for playback;

storing the encoded data blocks on at least one server computer;

managing within a central hub requests by client computers for delivery of content stored on the at least one server computer, to determine which data to transmit to a given client computer so as to accommodate the given client computer bandwidth;

transmitting necessary data blocks from at least one of the at least one server computer to the hub;

transmitting necessary data from the hub to the given client computer;

storing the data blocks transmitted by the at least one server computer in a cache residing in the hub; and reconstructing an appropriate version of the content on the given client computer.

10. A method according to claim 9 herein said managing is performed by:

setting inventory flags to indicate which data blocks are currently stored in the hub.

11. A method according to claim 10 wherein said managing further includes:

communicating with at least one of the at least one server computer to monitor which content is outdated;

removing from cache data blocks corresponding to the content which is outdated; and resetting the inventory flags to indicate that the removed data blocks are no longer stored in the cache.

12. A method according to claim 9 further comprising processing within the hub data blocks it receives, comprising:

decoding the data blocks received;

integrating the decoded data blocks together to reconstruct appropriate versions of the content; and encoding the reconstructed versions of the content into an intermediate encoded form for further transmission to the client computers.

13. A proxy system operative on a server/client network for caching of data which gets transmitted from server computers to client computers on a central hub, comprising:

an encoder for compressing content into a series of encoded data blocks with the property that successive blocks when decoded and integrated together provide successively higher bandwidth versions of the content for playback;

at least one server communication line from at least one server computer to a central hub for sending data blocks;

client communication lines from the hub to client computers for sending digital data;

at least one storage device for storing the encoded data blocks on the at least one server computer;

a management unit within the hub to process requests by the client computers for delivery of content stored on at least one of the at least one server computer, and to determine which data to transmit to a given client computer so as to accommodate the given client computer bandwidth;

a transmitter for delivering necessary data blocks on the at least one server communication line from at least one server computer to the hub;

a transmitter for delivering necessary data on the client communication lines from the hub to the given client computer;

a storage device for saving the data blocks delivered by the server communication lines in a cache residing in the hub; and a decoder for reconstructing an appropriate version of the content on the client computer.

14. The system as claimed in claim 13 wherein said management unit operates by setting inventory flags to indicate which data blocks are currently stored in the hub.

15. The system as claimed in claim 14 wherein said management unit operates by monitoring from at least one of the at least one server computer which content is outdated, removing from cache the data blocks corresponding to the content which is outdated, and resetting the inventory flags to indicate that the removed data blocks are no longer stored in the cache.

16. The system as claimed in claim 13 further comprising a processing unit within the hub comprising:

a decoder for decompressing data blocks received;

an accumulator for integrating the decoded data blocks together to reconstruct appropriate versions of the content; and an encoder for compressing the reconstructed versions of the content into an intermediate encoded form for further transmission to the client computers.

17. A multi-casting unit (MCU) system operative on a broadcasting network for caching of data which gets transmitted from stations to viewers, comprising:

an encoder for compressing content into a series of encoded data blocks with the property that successive blocks when decoded and integrated together provide successively higher bandwidth versions of the content for playback;

station communication lines from at least one station to an MCU for sending data blocks;

viewer communication lines from the MCU to viewers for sending data;

viewer receivers for receiving data sent by the MCU;

at least one storage device for storing the data blocks on at least one station;

a management unit within the MCU to process requests by viewers for delivery of content stored on at least one of the at least one station, and to determine which data blocks to transmit to a given viewer receiver so as to accommodate the given viewer bandwidth;

a transmitter for delivering necessary data blocks on the at least one station communication line from at least one station to the MCU;

a transmitter for delivering necessary data on the viewer communication lines from the MCU to the given viewer receiver;

a storage device for saving data blocks delivered by the station communication lines in a cache residing in the MCU; and a decoder for reconstructing an appropriate version of the content on the given viewer.

18. The system as claimed in claim 17 wherein said management unit operates by setting inventory flags to indicate which data blocks are currently stored in the MCU.

19. The system as claimed in claim 18 wherein said management unit operates by monitoring from at least one of the at least one station which content is outdated, removing from cache the data blocks corresponding to the content which is outdated, and resetting the inventory flags to indicate that the removed data blocks are no longer stored in the cache.

20. The system as claimed in claim 17 further comprising a processing unit within the MCU comprising:

a decoder for decompressing data blocks received;

an accumulator for integrating the data blocks together to reconstruct appropriate versions of the content; and an encoder for compressing the reconstructed versions of the content into an intermediate encoded form for further transmission to the viewers.

* * * * *